US012192973B2

(12) United States Patent
Dinan

(10) Patent No.: US 12,192,973 B2
(45) **Date of Patent: *Jan. 7, 2025**

(54) REDUCED TRANSMISSION POWER TIME INTERVAL INDICATION IN WIRELESS NETWORKS

(71) Applicant: Comcast Cable Communications, LLC, Philadelphia, PA (US)

(72) Inventor: Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,637

(22) Filed: May 17, 2023

(65) Prior Publication Data

US 2023/0371009 A1 Nov. 16, 2023

Related U.S. Application Data

(63) Continuation of application No. 17/027,243, filed on Sep. 21, 2020, now Pat. No. 11,696,265, which is a (Continued)

(51) Int. Cl.
*H04W 72/0446* (2023.01)
*H04L 1/00* (2006.01)
(Continued)

(52) U.S. Cl.
CPC ........... *H04W 72/0446* (2013.01); *H04L 1/00* (2013.01); *H04L 1/0003* (2013.01); *H04L 1/0009* (2013.01); *H04L 1/0026* (2013.01); *H04L 1/0057* (2013.01); *H04L 1/06* (2013.01); *H04L 5/0046* (2013.01); *H04L 5/0053* (2013.01); *H04L 27/2601* (2013.01); *H04W 72/0453* (2013.01); *H04W 72/12* (2013.01); *H04W 72/23* (2023.01); *H04W 72/542* (2023.01); *H04L 1/0064* (2013.01); *H04W 28/18* (2013.01); *H04W 72/54* (2023.01); *H04W 84/045* (2013.01)

(58) Field of Classification Search
CPC ................................................ H04W 72/0446
See application file for complete search history.

(56) References Cited

U.S. PATENT DOCUMENTS 6,799,220 B1 9/2004 Merritt et al.
7,136,680 B2 11/2006 Leizerovich et al.
(Continued)

OTHER PUBLICATIONS

3GPP TSG RAN WG1 Meeting #63 R1-106049, Jacksonville, USA, Nov. 15-19, 2010, Source: Samsung, Title: CSI measurement restriction for macro-pico scenarios.
(Continued)

*Primary Examiner* — Jason E Mattis
(74) *Attorney, Agent, or Firm* — Banner & Witcoff, Ltd.

(57) ABSTRACT

Wireless communications are described. Reduced transmission power time intervals may be employed in communications via one or more cells. A wireless device may receive an indication of measurement resources for one or more cells. The wireless device may transmit channel state information for one or more of the cells. Cross carrier scheduling may be employed.

42 Claims, 10 Drawing Sheets

10 ms
5 ms
subframe
901 902 903 904
Macro BS | 0 | 1 | 2 | 3 | 4 | 5 | 6 | 7 | 8 | 9
905 906
Femto BS | 0 | 1 | 2 | 3 | 4 | 5 | 6 | 7 | 8 | 9

Almost Blank Subframe
Normal Subframe

Related U.S. Application Data continuation of application No. 16/298,650, filed on Mar. 11, 2019, now Pat. No. 10,785,771, which is a continuation of application No. 15/383,473, filed on Dec. 19, 2016, now Pat. No. 10,231,236, which is a continuation of application No. 14/605,131, filed on Jan. 26, 2015, now Pat. No. 9,526,104, which is a continuation of application No. 13/732,161, filed on Dec. 31, 2012, now Pat. No. 8,971,275.

(60) Provisional application No. 61/582,309, filed on Dec. 31, 2011, provisional application No. 61/582,310, filed on Dec. 31, 2011.

(51) Int. Cl.

| | |
|---|---|
| ***H04L 1/06*** | (2006.01) |
| ***H04L 5/00*** | (2006.01) |
| ***H04L 27/26*** | (2006.01) |
| ***H04W 72/0453*** | (2023.01) |
| ***H04W 72/12*** | (2023.01) |
| ***H04W 72/23*** | (2023.01) |
| ***H04W 72/542*** | (2023.01) |
| *H04W 28/18* | (2009.01) |
| *H04W 72/54* | (2023.01) |
| *H04W 84/04* | (2009.01) |

(56) References Cited

U.S. PATENT DOCUMENTS 8,588,127 B2 11/2013 Koskinen
8,755,316 B2 6/2014 Aschan et al.
8,817,736 B2 8/2014 Dinan
8,873,467 B2 10/2014 Dinan
8,897,235 B2 11/2014 Luo et al.
8,929,215 B2 1/2015 Dinan
8,934,436 B2 1/2015 Dinan
8,937,918 B2 1/2015 Dinan
8,971,250 B2 3/2015 Dinan
8,971,275 B2 * 3/2015 Dinan .................. H04L 1/0026 370/328
9,049,724 B2 6/2015 Dinan
9,155,080 B2 10/2015 Kim et al.
9,237,563 B2 1/2016 Kim et al.
9,253,763 B2 2/2016 Dinan
9,277,562 B2 3/2016 Dinan
9,295,059 B2 3/2016 Dinan
9,295,060 B2 3/2016 Dinan
9,325,469 B2 4/2016 Dinan
9,326,286 B2 4/2016 Dinan
9,526,104 B2 * 12/2016 Dinan .................. H04L 1/0009
9,538,396 B2 1/2017 Seo et al.
9,549,382 B2 1/2017 Dinan
9,565,647 B2 * 2/2017 Dalsgaard ............ H04L 5/0078
9,565,674 B2 2/2017 Dinan
9,591,637 B2 3/2017 Dinan
9,591,651 B2 3/2017 Dinan
9,596,681 B2 3/2017 Dinan
9,698,922 B2 7/2017 Dinan
10,231,236 B2 * 3/2019 Dinan .................. H04W 72/12
10,785,771 B2 * 9/2020 Dinan ...................... H04L 1/06
11,696,265 B2 * 7/2023 Dinan .................. H04L 1/0026 370/329
2004/0071090 A1 4/2004 Corson et al.
2007/0097867 A1 5/2007 Kneckt et al.
2007/0211745 A1 9/2007 Deshpande et al.
2007/0297324 A1 12/2007 Lindoff et al.
2008/0208802 A1 8/2008 Bhattacharjee et al.
2009/0168705 A1 7/2009 Kim et al.
2009/0232108 A1 9/2009 Haghighat et al.
2009/0252077 A1 10/2009 Khandekar et al.
2009/0257409 A1 10/2009 Chang et al.
2010/0008282 A1 1/2010 Bhattad et al.
2010/0020771 A1 1/2010 Ji et al.
2010/0029213 A1 2/2010 Wang
2010/0085913 A1 4/2010 Subrahmanya
2010/0214990 A1 8/2010 Fukui
2010/0254483 A1 10/2010 Chun et al.
2010/0322190 A1 12/2010 Satou et al.
2011/0013554 A1 1/2011 Koskinen
2011/0085519 A1 4/2011 Koivisto et al.
2011/0092231 A1 4/2011 Yoo et al.
2011/0116437 A1 5/2011 Chen et al.
2011/0134774 A1 6/2011 Pelletier et al.
2011/0143672 A1 6/2011 Yoo et al.
2011/0212738 A1 9/2011 Wan et al.
2011/0228883 A1 9/2011 Liu et al.
2011/0235599 A1 9/2011 Nam et al.
2011/0243066 A1 10/2011 Nayeb Nazar et al.
2011/0250897 A1 10/2011 Seo et al.
2011/0269492 A1 11/2011 Wang
2011/0292826 A1 12/2011 Ahn et al.
2012/0008570 A1 1/2012 Li et al.
2012/0033646 A1 2/2012 Luo et al.
2012/0044857 A1 2/2012 Kim et al.
2012/0045014 A1 2/2012 Damnjanovic et al.
2012/0063405 A1 3/2012 Han et al.
2012/0122440 A1 * 5/2012 Krishnamurthy ..... H04L 5/0053 455/418
2012/0188988 A1 7/2012 Chung et al.
2012/0201162 A1 8/2012 Kim et al.
2012/0231790 A1 9/2012 Lindoff et al.
2012/0236776 A1 9/2012 Zhang et al.
2012/0287882 A1 11/2012 Kim et al.
2012/0294248 A1 11/2012 Seo et al.
2012/0314567 A1 12/2012 Seo et al.
2013/0033998 A1 2/2013 Seo et al.
2013/0039268 A1 2/2013 Blankenship et al.
2013/0044727 A1 2/2013 Nory et al.
2013/0051356 A1 2/2013 Hong et al.
2013/0064190 A1 3/2013 Hariharan et al.
2013/0083736 A1 4/2013 Yin et al.
2013/0083740 A1 4/2013 Eriksson et al.
2013/0114498 A1 5/2013 Park et al.
2013/0114517 A1 5/2013 Blankenship et al.
2013/0115988 A1 5/2013 Sun et al.
2013/0128765 A1 5/2013 Yang et al.
2013/0142291 A1 * 6/2013 Dinan ................. H04L 27/2666 375/343
2013/0176981 A1 7/2013 Earnshaw et al.
2013/0195066 A1 8/2013 Lee et al.
2013/0223258 A1 * 8/2013 Seo ........................ H04B 7/084 370/252
2013/0223400 A1 8/2013 Seo et al.
2013/0229971 A1 9/2013 Siomina et al.
2013/0242924 A1 9/2013 Kim et al.
2013/0258895 A1 10/2013 Kim et al.
2013/0260766 A1 10/2013 Lee et al.
2013/0279343 A1 * 10/2013 Jeong .................... H04L 5/0048 370/241
2013/0279459 A1 10/2013 Lee et al.
2013/0286880 A1 10/2013 Lee et al.
2013/0286883 A1 * 10/2013 Kim ........................ H04W 8/24 370/252
2013/0286933 A1 * 10/2013 Lee ....................... H04L 1/0026 370/329
2013/0308466 A1 11/2013 Yoo et al.
2013/0315115 A1 11/2013 Kim et al.
2013/0315168 A1 11/2013 Frank et al.
2013/0329612 A1 * 12/2013 Seo ..................... H04W 72/541 370/280
2013/0336302 A1 12/2013 Lee et al.
2014/0022961 A1 1/2014 Park et al.
2014/0024388 A1 1/2014 Earnshaw et al.
2014/0036865 A1 2/2014 Camarda et al.
2014/0050205 A1 2/2014 Ahn et al.
2014/0086166 A1 3/2014 Lindbom et al.
2014/0112263 A1 4/2014 Lee et al.
2014/0119323 A1 5/2014 Chung et al.
2014/0126512 A1 * 5/2014 Kim ...................... H04L 5/0073 370/329

(56) References Cited

U.S. PATENT DOCUMENTS

| | | | | |
|---|---|---|---|---|
| 2014/0133346 | A1 | 5/2014 | Kang et al. | |
| 2014/0153452 | A1* | 6/2014 | Son | H04J 11/003 370/280 |
| 2014/0169276 | A1* | 6/2014 | Choi | H04L 1/06 370/328 |
| 2014/0376507 | A1 | 12/2014 | Johansson et al. | |
| 2017/0078011 | A1 | 3/2017 | Kim et al. | |

OTHER PUBLICATIONS

3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).

3GPP TS 36.212 V10.0.0 (Dec. 2010), 3rd Generation Partnership Project; Technical Specification Group Radio Access Network; Evolved Universal Terrestrial Radio Access (E-UTRA); Multiplexing and channel coding (Release 10).

3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).

3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overalldescription; Stage 2 (Release 10).

3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).

3GPP TSG RAN WG1 Meeting #50 R1-073686 Athens, Greece, Aug. 20-24, 2007 Source: NTT DoCoMo Title: Necessity of Time Diversity for D-BCH.

3GPP TSG RAN WG4 Meeting #57 R4-104433 Jacksonville, US, Nov. 15-19, 2010 Source: Ericsson, ST-Ericsson Title: Analysis of patterns and their impact on intra-frequency requirements for eICIC.

3GPP TSG-RAN WG1#63 R1-105879 Jacksonville, US, Nov. 15-19, 2010 Source: Ericsson, ST-Ericsson Title: On details of restricted CSI measurements.

3GPP TSG RAN WG2 Meeting #72, R2-106622, Jacksonville, USA, Nov. 15-19, 2010, Source: Research in Motion UK Limited, Title: Measurement Configuration for eICIC.

3GPP TSG RAN WG2 Meeting #75bis, R2-115305, Oct. 11-14, 2011, Zhuhai, China, Source: New Postcom, Title: Measurement restriction trigger in inter-frequency eICIC.

3GPP TSG RAN WG2 Meeting #75bis, R2-114904, Zhuhai, China, Oct. 10-14, 2011, Source: New Postcom, Title: Inter-frequency resource-restricted measurement for TD-ICIC.

3GPP TSG-RAN WG2 #72, Tdoc R2-106654, Jacksonville, FL, USA, Nov. 15-19, 2010, Source: Ericsson, ST-Ericsson, Title: On signalling in eICIC scenarios.

3GPP TSG-RAN WG2 #75bis, Tdoc R2-115334, Zhuhai, PR China, Oct. 10-14, 2011, Source: Ericsson, ST-Ericsson, Qualcomm Incorporated, Title: On Measurement Resource Restrictions and MBSFN.

3GPP TSG-RAN WG2 Meeting #72, R2-106223, Jacksonville, United States, Nov. 15-19, 2010, Source: Nokia Siemens Networks, Nokia Corporation Title: Network-to-Ue signalling for TDM eICIC.

3GPP TSG-RAN WG2 meeting #72, R2-106244, Jacksonville, United States, Nov. 15-19, 2010, Source: Email discussion rapporteur (Qualcomm Incorporated), Title: Email discussion [71 b#26]: LTE: Enhanced ICIC—Mobility scenarios.

3GPP TSG-RAN WG2 meeting #72, R2-106245, Jacksonville, US, Nov. 15-19, 2010, Source: Qualcomm Incorporated, Title: Way forward for connected mode eICIC.

3GPP TSG-RAN WG2 meeting #72, R2-106332, Jacksonville, United States, Nov. 15-19, 2010, Source: ZTE, Title: Discussion on measurement restriction of eICIC.

3GPP TSG-RAN WG2 Meeting #72, R2-106381, Jacksonville USA, Nov. 15-19, 2010, Source: CMCC, Title: Considerations on measurement resource restriction for eICIC.

3GPP TSG-RAN WG2 Meeting #72, R2-106449, Nov. 15-19, 2010, Jacksonville, USA, Source: Alcatel-Lucent, Title: Signalling support for Almost Blank Subframe patterns.

3GPP TSG-RAN WG2 Meeting #72, R2-106451, Nov. 15-19, 2010, Jacksonville, USA, Source: Alcatel-Lucent, Alcatel-Lucent Shanghai Bell, Title: RRC signalling design for Almost Blank Subframe patterns.

3GPP TSG-RAN WG2 Meeting #75, R2-114052, Athens, Greece, Aug. 22-26, 2011, Source: Renesas Mobile Europe Ltd., Title: Discussion on Rel'11 eICIC Scenarios.

3GPP TSG-RAN WG2 Meeting #75, R2-114099, Athens, Greece, Aug. 22-26, 2011, Source: Huawei, HiSilicon, Title: Inter-frequency measurement under eICIC.

3GPP TSG-RAN WG2 Meeting #75bis, R2-115252, Zhuhai, China, Oct. 10-14, 2011, Source: CMCC, Title: Measurement resource restriction for inter-frequency measurement in R11 eICIC.

3GPP TSG-RAN WG2 Meeting #75bis, R2-114947, Zhuhai, China, Oct. 10-14, 2011, Source: ZTE, Title: Measurement Restriction for Inter-frequency eICIC.

3GPP TSG-RAN WG2 Meeting #75bis, R2-115130, Zhuhai, China, Oct. 10-14, 2011, Source: Renesas Mobile Ltd., Title: Using eICIC for inter-frequency measurements.

3GPP TSG-RAN WG2 Meeting #75bis, R2-115133, Zhuhai, China, Oct. 10-14, 2011, Source: Renesas Mobile Europe Ltd., Title: Discussion on Rel-11 eICIC enhancements.

3GPP TSG-RAN WG2 Meeting #75bis, R2-115348, Oct. 10-14, 2011, Zhuhai, China, Source: Alcatel-Lucent, Alcatel-Lucent Shanghai Bell, Title: Requirement of measurement subframe restriction for eICIC with CA.

3GPP TSG-RAN WG2 Meeting #75bis, R2-115361, ZhuHai, China, Oct. 10-14, 2011, Source: Interdigital, Title: Inter-frequency eICIC enhancements for Rel-11.

3GPP TSG-RAN WG2 Meeting #76, R2-115982, San Francisco, U.S., Nov. 14-18, 2011, Source: Research in Motion UK Limited, Title: Release of measSubframePatternConfigNeigh upon reestablishment.

3GPP TSG-RAN WG2 Meeting #76, R2-115765, San Francisco, USA, Nov. 14-18, 2011, Source: Zte, Title: SCell Measurement Restriction.

3GPP TSG-RAN WG2 Meeting #76, R2-115979, San Francisco, U.S., Nov. 14-18, 2011, Source: Research Motion UK Limited, Title: Alignment between SPS and subframe pattern.

3GPP TSG-RAN WG2 Meeting #76, R2-116333, San Francisco, Nov. 14-19, 2011, Source: Qualcomm Incorporated, Title: UE behavior about measurements for eICIC with MBSFN subframes.

3GPP TSG-RAN2 Meeting #72, R2-106579, Jacksonville, USA, Nov. 15-19, 2010, Source: LG Electronics Inc., Title: Measurement restriction for macro-pico scenario.

3GPP TSG-RAN2 Meeting #75bis, R2-114969, Zhuhai, China, Oct. 10-14, 2011, Source: Potevio, Title: Consideration on the solutions for restricted measurement of inter-frequency.

3GPP TSG-RAN2#75 meeting, R2-114036, Athens, Greece, Aug. 22-26, 2011, Source: Samsung, Title: Inter-frequency eICIC enhancements for Rel 11.0.

3GPP TSG RAN WG3 Meeting #70 R3-103191, Jacksonville (FL), USA, Nov. 15-19, 2010, Source: New Postcom, Title: Self-organized mechanism for TD-based eICIC.

Apr. 21, 2015—European Search Report—EP 14197792.

Jul. 15, 2013—PCT Search Report—PCT/US2012/062482.

3GPP TS 36.300 V10.0.0 (Jun. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TSG-RAN WG1 #66 R1-112648 Athens, Greece, Aug. 15-19, 2011 Source: Ericsson, ST-Ericsson Title: On scenarios for further time domain ICICI evaluations.

3GPP TS 36.300 V10.5.0 (Sep. 2011) 3rd Generation Partnership Project; Technical Specification Group Radio Access Network; Evolved Universal Terrestrial Radio Access (E-UTRA) and Evolved

(56) References Cited

OTHER PUBLICATIONS

Universal Terrestrial Radio Access Network (E-UTRAN); Overall description; Stage 2 (Release 10).
Apr. 30, 2020—European Extended Search Report—EP 20162996.1.

* cited by examiner

REDUCED TRANSMISSION POWER TIME INTERVAL INDICATION IN WIRELESS NETWORKS

CROSS-REFERENCE TO RELATED APPLICATIONS

This application is a continuation of and claims priority to U.S. patent application Ser. No. 17/027,243, filed Sep. 21, 2020, which is a continuation of U.S. patent application Ser. No. 16/298,650, filed Mar. 11, 2019 (now U.S. Pat. No. 10,785,771), which is a continuation of U.S. patent application Ser. No. 15/383,473, filed Dec. 19, 2016 (now U.S. Pat. No. 10,231,236), which is a continuation of U.S. patent application Ser. No. 14/605,131, filed Jan. 26, 2015 (now U.S. Pat. No. 9,526,104), which is a continuation of U.S. patent application Ser. No. 13/732,161, filed Dec. 31, 2012 (now U.S. Pat. No. 8,971,275), which claims the benefit of U.S. Provisional Application No. 61/582,309, filed Dec. 31, 2011, and U.S. Provisional Application No. 61/582,310, filed Dec. 31, 2011, each of which is hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable special subframe allocation in wireless communication systems. Embodiments of the technology disclosed herein may be employed, for example, in the technical field of heterogeneous wireless communication systems. More particularly, the embodiments of the technology disclosed herein may relate to providing dynamic special subframe allocation in heterogeneous wireless communication systems.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
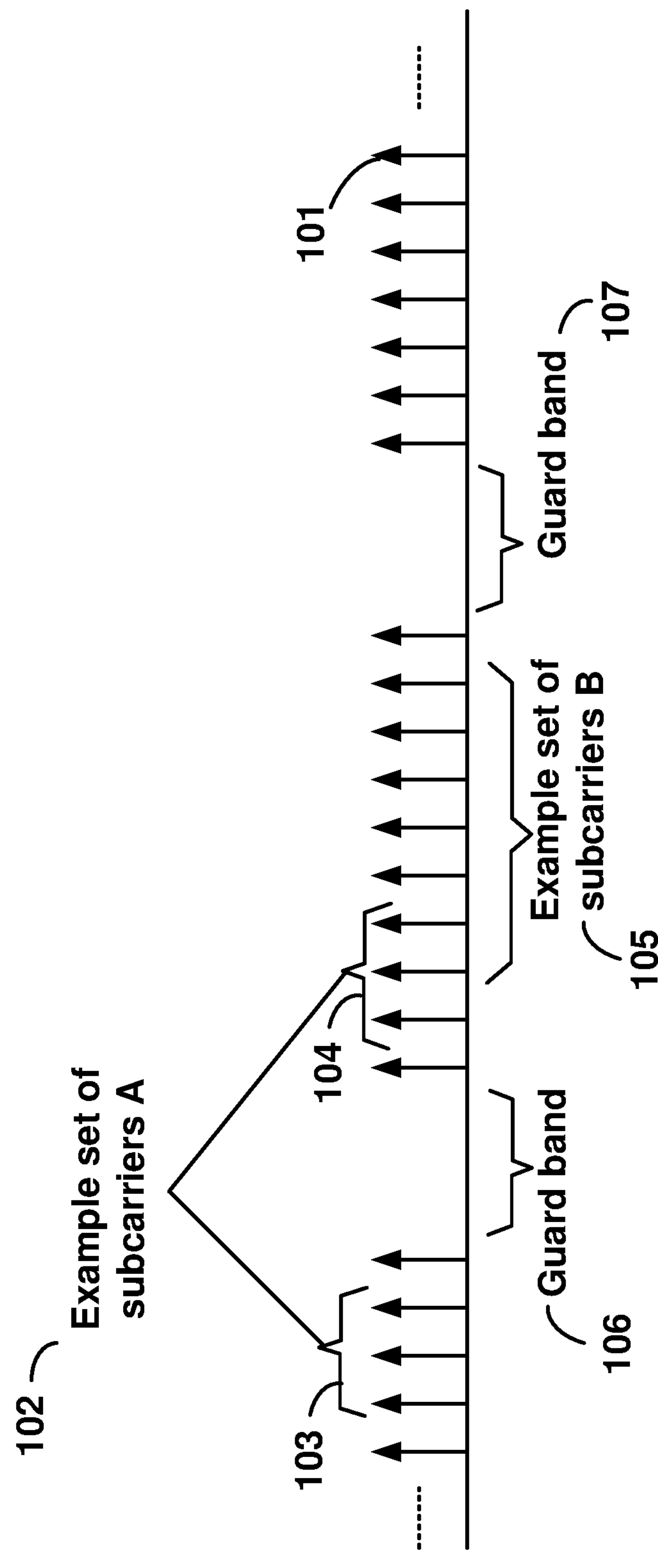
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
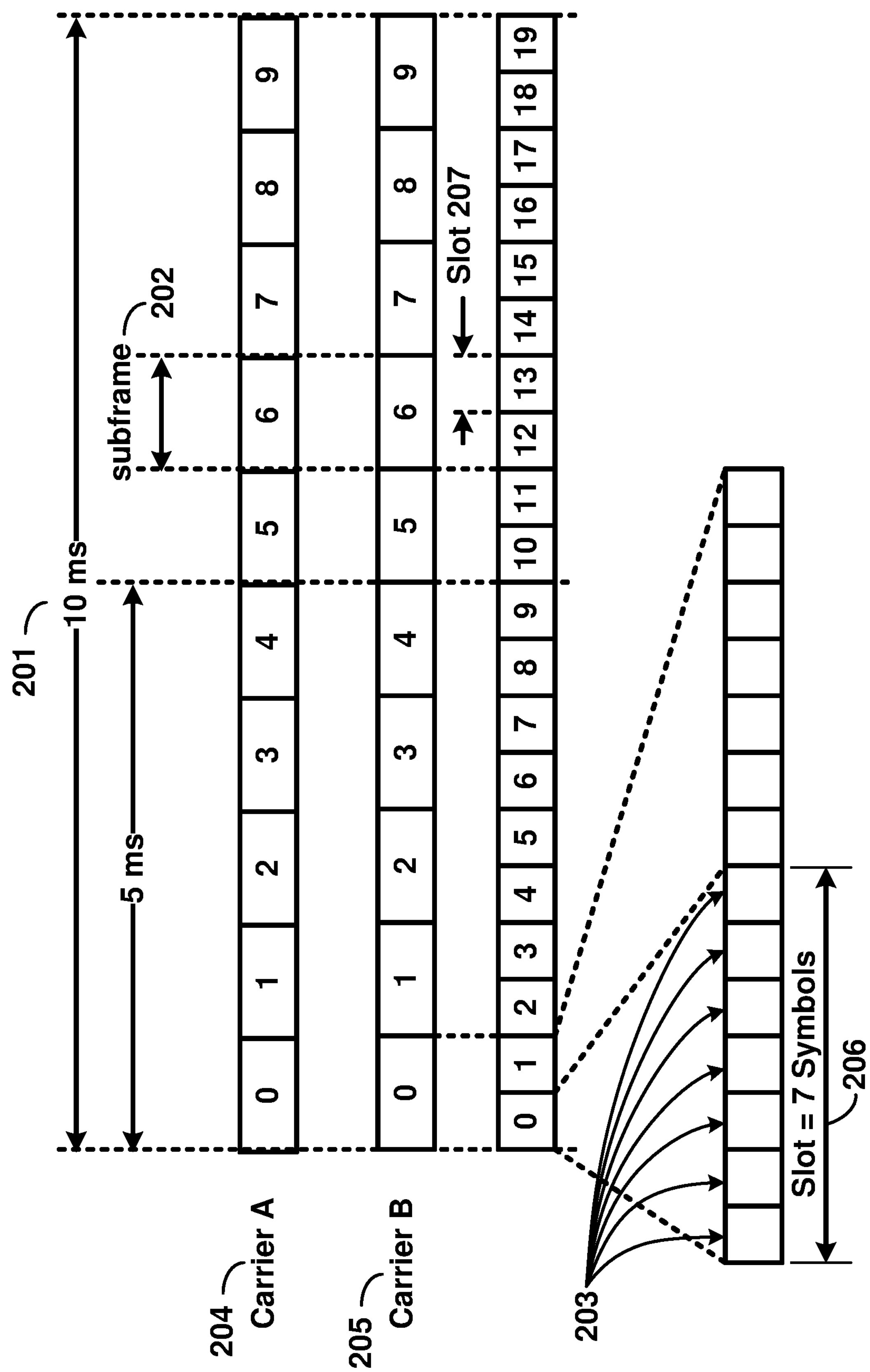
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
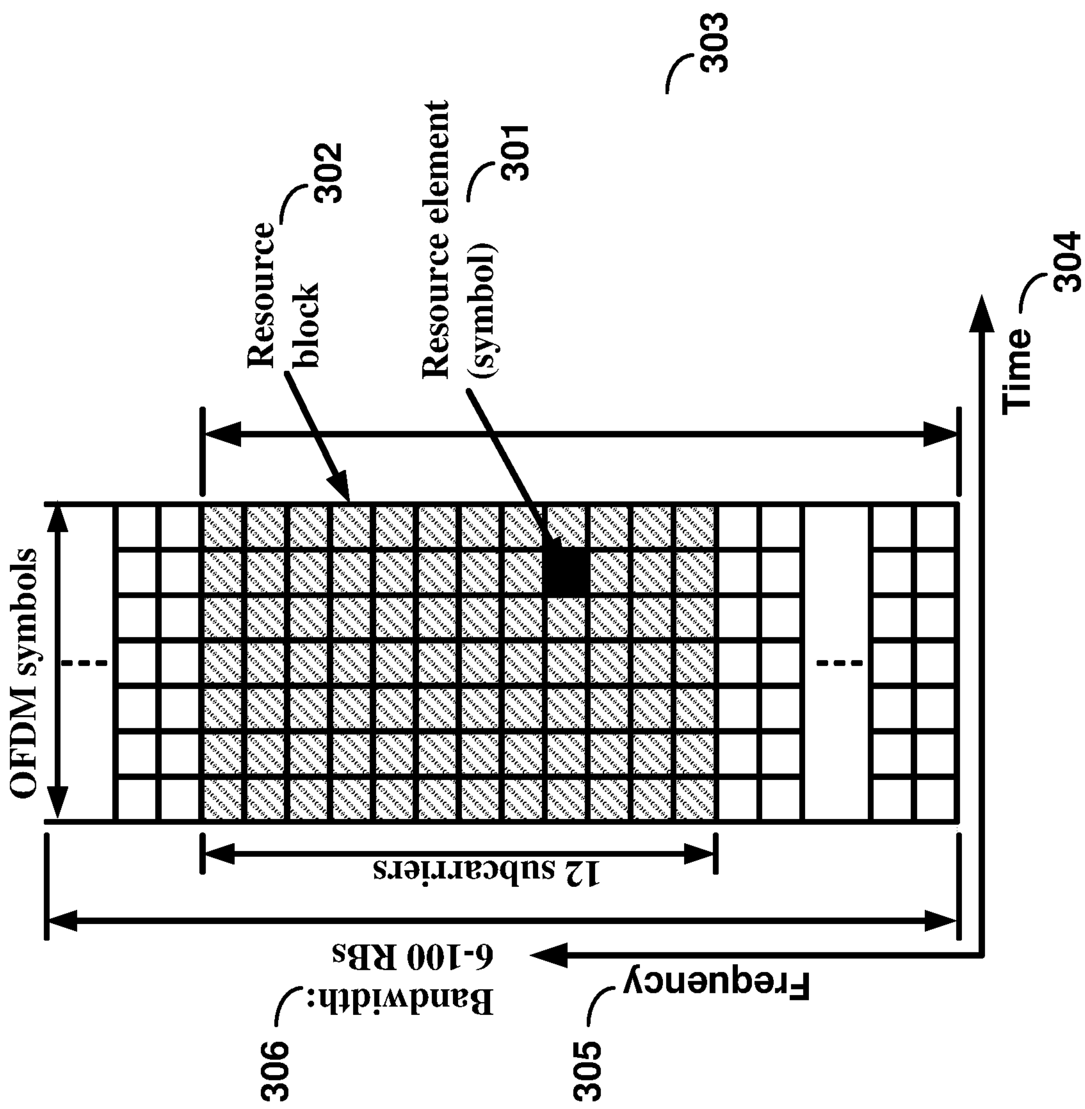
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
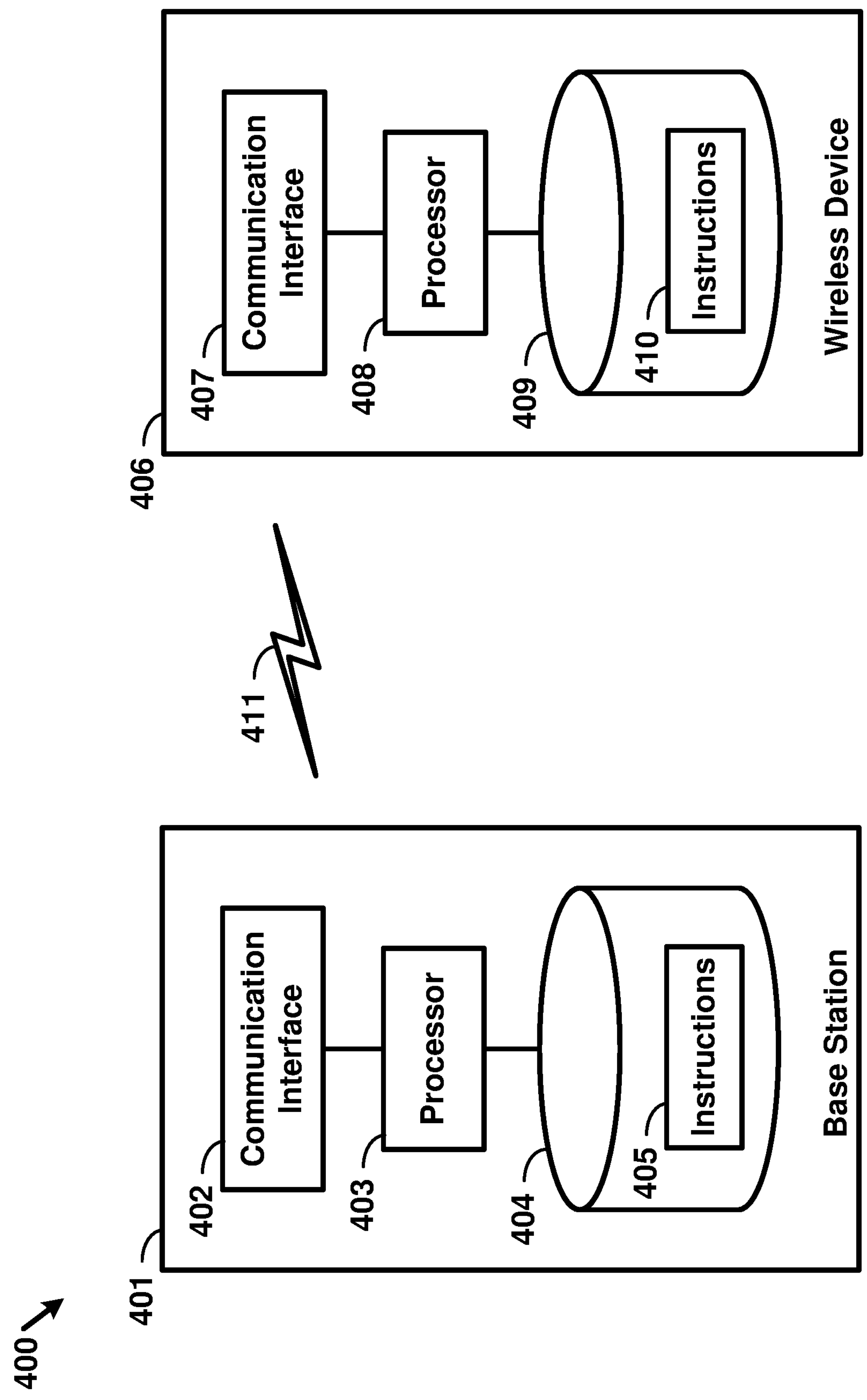
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
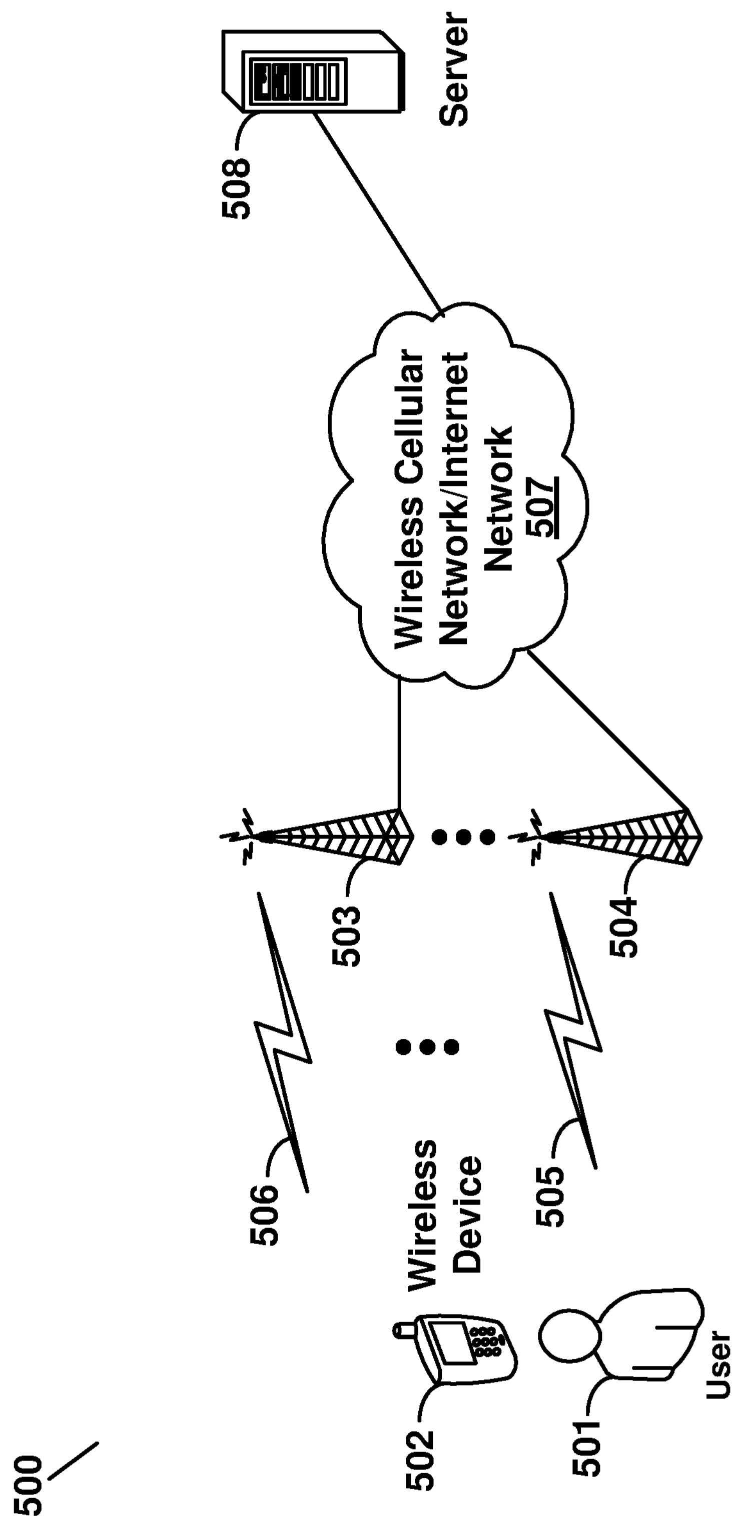
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Figure 6:
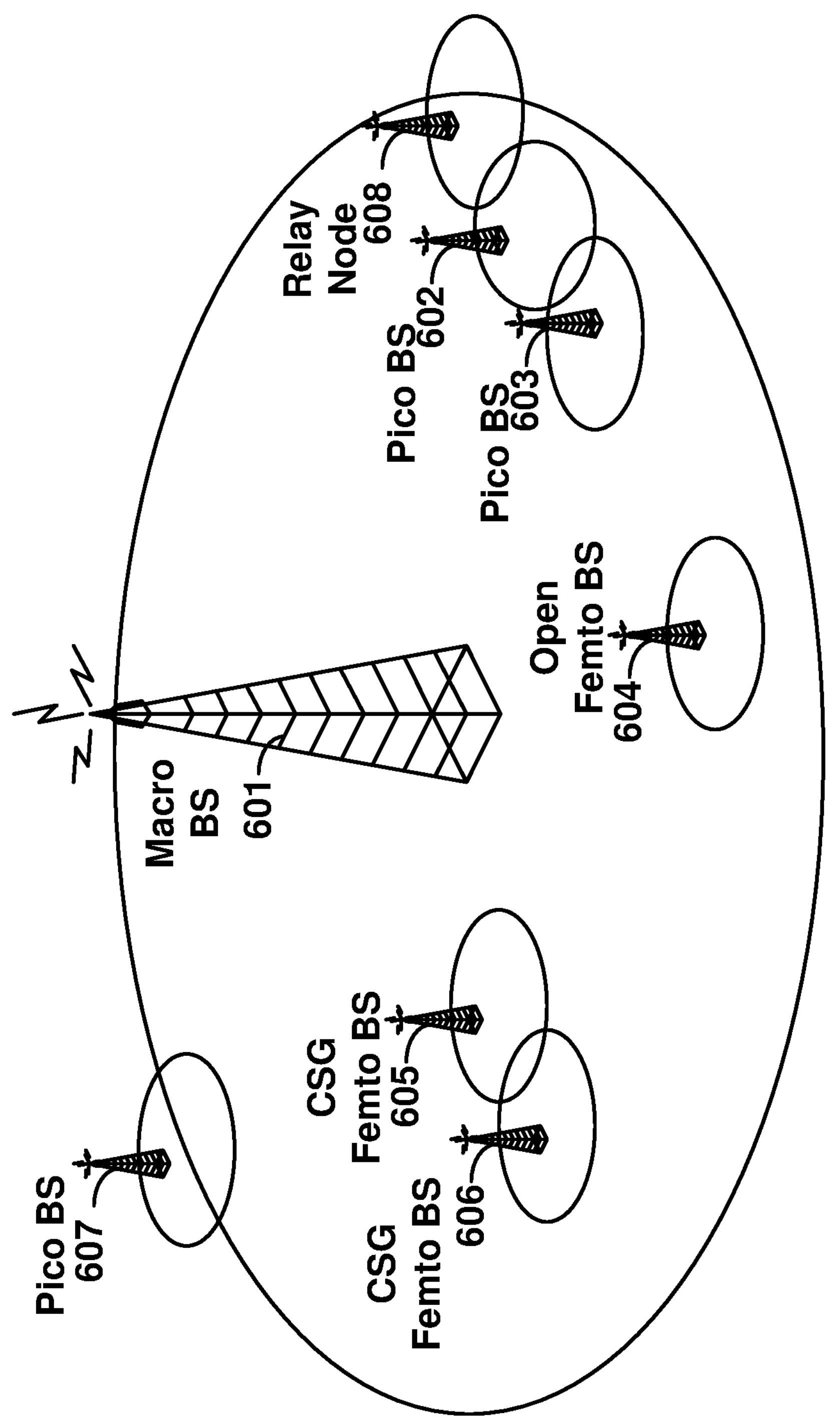
FIG. 6 is a diagram depicting an example heterogeneous network as per an aspect of an embodiment of the present invention.

FIG. 6 shows an example heterogeneous network in an example embodiment. The coverage and capacity of macro base station 601 may be extended by the utilization of base stations with lower transmit power. Micro, Pico, femto and relay nodes are examples of low power base stations. In an example embodiment, pico base stations (or pico-cell) 602, 603, and 607 may have transmit power ranges from approximately 200 mW to approximately 5 W. Macro base stations may have a transmit power that typically varies between 5 and 100 W. Femto base stations (or femto-cells) may be used for local services such as in indoor services, and their transmit power may be approximately 200 mW or less. These are just some example power ranges, and as such, should not be considered as a hard limit on the transmit power of a base station type. For example, some femto-cell product may transmit at a power greater than 200 mW. Femto or pico base stations 605, 606 may be configured with a restricted subscriber group that may allow access only to its closed subscriber group (CSG) members. Such femto or pico base stations may be referred to as closed femtos or picos. Femto or pico base stations may also be configured as open femtos 604 or picos 602, 603. Relay Nodes (e.g. 608) may employ the macro base stations air interface as a backhaul and may increase coverage and capacity of the macro base station. A network that comprises of a mix of macro base stations and low-power nodes such as pico or femto base stations, where some base stations may be configured with restricted access and some may lack a wired backhaul, is referred to as a heterogeneous network.

Femto cells may be classified as open or closed depending on whether the femto cells allow access to all, or to a restricted set of wireless devices. Closed femtos may restrict the access to a closed subscriber group (CSG). Open femtos may be similar to pico-cells, but may use the network backhaul provided by the home network. A femto cell may also be a hybrid, whereby many wireless devices may have access, but with lower priority for the wireless devices that do not belong to the femto's subscriber group. Closed femtos may not allow access to wireless devices, and may become a source of interference to those wireless devices. Co-channel deployments of closed femtos may cause coverage holes and hence outage of a size proportional to the transmit power of the femto-cell. Femto-cells may or may not have an X2 interface. OAM-based or X2 based techniques in conjunction with possibly autonomous power control techniques may be used for interference management with femto cells depending on the existence of a femto X2 interface. These techniques may reduce the outage and/or interference that these network nodes cause around them and enable reception of the signal from the macro-cell in close proximity to the closed femto.

Co-channel deployment of low-power nodes and high power nodes may introduce new challenges. The introduction of low-power nodes in a macro network may create an imbalance between uplink and downlink coverage. Due to the larger transmit power of the macro base station, the handover boundary may be shifted closer to the low-power node. This shift may lead to severe uplink interference problems as wireless devices served by macro base stations create strong interference to the low-power nodes. Given the relatively small footprint of low-power nodes, low-power nodes may become underutilized due to geographic changes in data traffic demand. The limited coverage of low-power nodes may be a reason for limited performance gain in heterogeneous networks. Some of the deployed femto cells may have enforced restricted associations, which may create a coverage hole and may exacerbate the interference problem.

Figure 7:
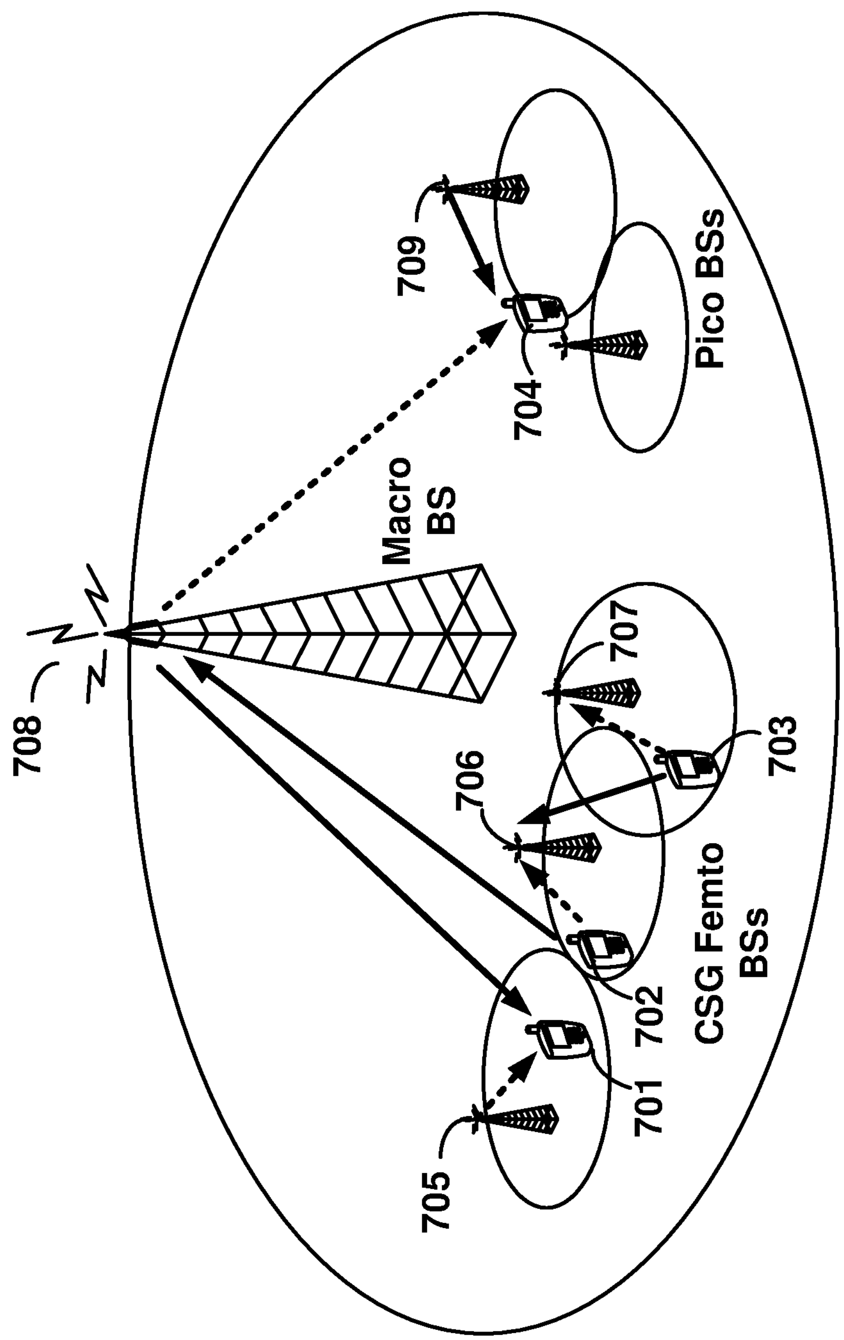
FIG. 7 is a diagram illustrating a few example interference scenarios as per an aspect of an embodiment of the present invention.

FIG. 7 illustrates a few example interference scenarios in an example embodiment. The solid arrow shows the desired signal, and the arrow with the dashed line shows the unwanted interference. Wireless device 701 may not be a member of CSG cell 705 and may be roaming in the coverage area of femto-cell 705. It may receive the signal from macro base station 708, and may receive high interference from CSG pico-cell 705. In another example, wireless device 702 may not be a member of CSG cell 706 and may be roaming in the coverage area of femto-cell 706. The wireless device 702 may transmit a signal to base station 708 in the macro base station uplink channel. The wireless device 702 may create high interference for femto-cell 706. The wireless device 703 may not be a member of CSG cell 707 and may be roaming in the coverage area of femto-cell 707. The wireless device 703 may be a member of CSG femto-cell 706 and may a transmit signal to femto-cell 706. The wireless device 703 may create high interference for femto-cell 707. In another example scenario, the wireless device 704 may be in the cell coverage edge of pico-cell 709. The wireless device 704 may receive a signal from pico-cell 709. The wireless device 704 may also receive high interference from macro base station 708. As shown in these examples, in order to cope with the interference, it may be required to introduce techniques that may adequately address these issues.

A new physical layer design in LTE networks may allow for flexible time and frequency resource partitioning. This added flexibility may enable macro- and femto/picocells to assign different time-frequency resource blocks within a carrier or different carriers (if available) to their respective wireless devices. This is one of the inter-cell interference coordination (ICIC) techniques and may be used on a downlink or an uplink to mitigate interference. With additional complexity, joint processing of serving and interfering base station signals may further improve the performance of heterogeneous networks.

According to some of the various aspects of embodiments, cell range expansion through handover biasing and resource partitioning among different node power classes may decrease interference. The biasing mechanism may allow for load balancing. Depending on the bias value, the network may control the number of wireless devices associated with the low-power nodes and therefore control traffic demand at those nodes. Resource partitioning, which may be adaptive, may allow configuration and adjustment of interference protected resources, enabling wireless devices in a cell's expanded area to receive data. Resource partitioning techniques may mitigate uplink and downlink interference and allow non-CSG member wireless devices to receive service when in proximity of closed femto-base stations.

In a heterogeneous network, the network nodes may be deployed in the same frequency layer. Deploying low-power nodes at the same frequency layer as the (high-power) macro-cells may present interference problems in the case of closed femtos. Also, for the case of open access nodes (open femtos, pico-cells, and RNs), the coverage of the low-power nodes may be overshadowed by the transmissions of the high-power nodes. Interference coordination techniques may solve these problems. A reduction of closed femto interference to the macro layer and a performance increase from the introduction of open access low-power nodes may be achieved by interference control techniques. To enable efficient support of co-channel deployment of heterogeneous networks, an interference management scheme may adapt to different traffic loads and different numbers of low-power nodes at various geographical areas.

According to some of the various aspects of embodiments, resource partitioning may be employed for interference management in co-channel deployments. To reach its full potential, resource partitioning may be paired with interference-cancellation-capable wireless devices. Similar approaches may be applied to micro, pico, femto, and relay nodes. Each node may have its own caveats. For example, the X2 backhaul link between the macro and relay base stations may be over an LTE air interface. In another example, closed femto cells may create their own interference challenges. Femto base stations may lack an X2 interface and employ static or dynamic interference management methods using OAM-based or similar solutions.

According to some of the various aspects of embodiments, adaptive interference management in LTE may be enabled through X2 backhaul coordination of resources used for scheduling data traffic. The granularity of the negotiated resource may be a subframe. One of the various motivations behind resource partitioning may be to control interference and/or enable cell range expansion through cell biasing. In a typical case, cell range expansion may be enabled to improve system capacity, and a cell bias may be applied to low-power nodes. The bias value may refer to a threshold that triggers a handover between two cells. A positive bias may enable a wireless device to be handed over to a pico-cell when the difference in the signal strength from the macro- and pico-cells drop below a bias value. The high-power node (macro base station) may inform the low-power node (pico base station) of which resources may be utilized for scheduling macro wireless device and which subframes would remain unutilized (almost blank subframes). Low-power nodes may be made aware of the interference pattern from a high-power base station and may schedule a wireless device in the cell extended areas on subframes protected from high-power interference. That is, subframes corresponding to almost blank subframes at the high-power base station.

Figure 8:
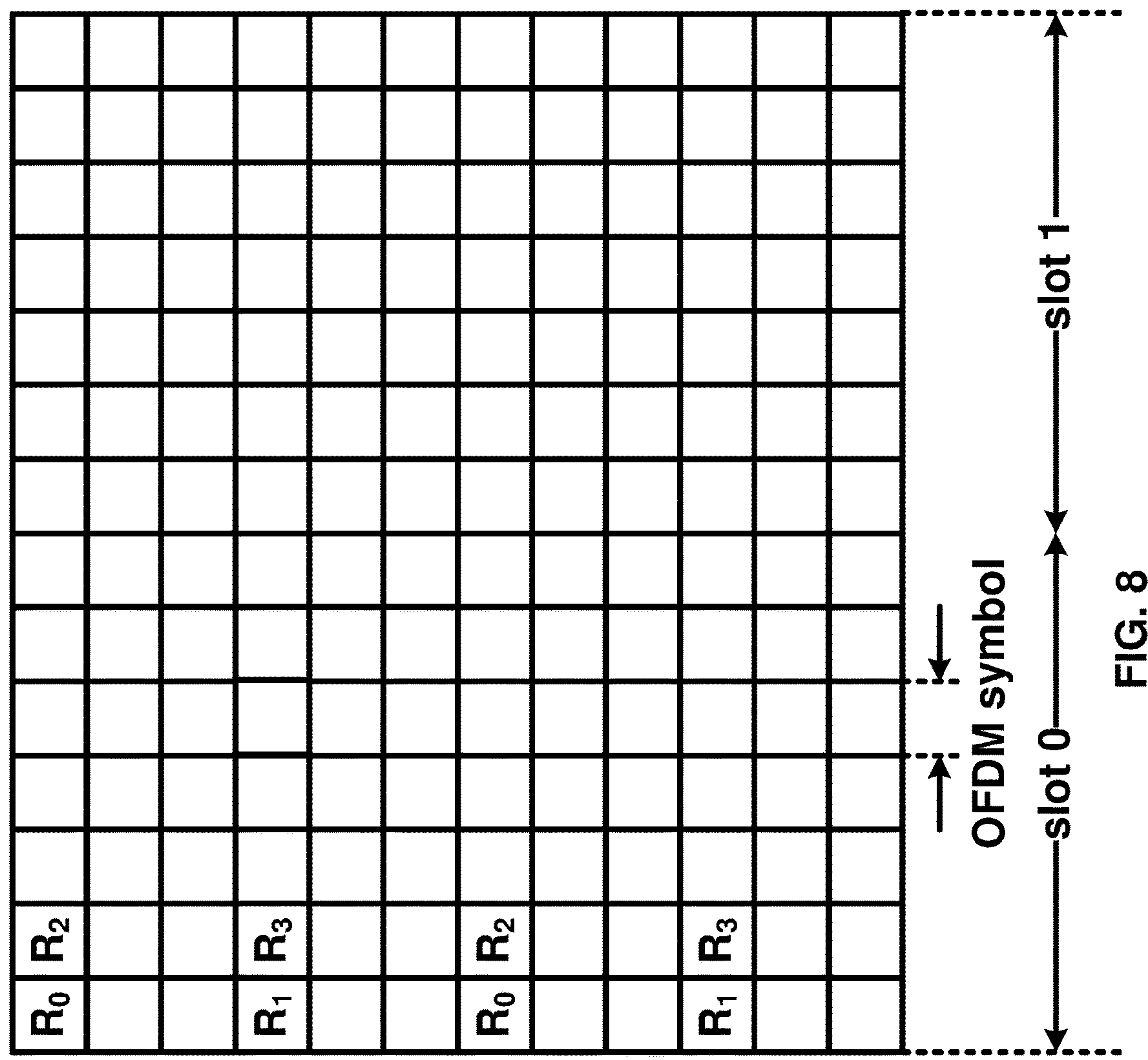
FIG. 8 is a diagram depicting an example almost blank subframe as per an aspect of an embodiment of the present invention.

According to some of the various aspects of embodiments, the X2 interface may enable direct base station to base station interface for inter-cell interference coordination (ICIC). Co-channel deployments of heterogeneous networks may require coordination of almost blank subframes. Almost blank subframes may reduce the interference created by the transmitting node while providing full legacy support. On almost blank subframes, base station may not schedule unicast traffic while it may transmit acquisition channels and common reference signal to provide legacy support. FIG. 8 shows an example almost blank subframe. In this example CRS (R0, R1, R2, R3 signals) are transmitted only in the control region and are not transmitted in the data region. The interfering base station may still transmit PSS, SSS, PBCH, and RSs to support legacy terminals. Some interference still may exist. In this example, no data may be transmitted in almost blank subframes or data may be transmitted at a substantially lower power in almost blank subframes.

Figure 9:
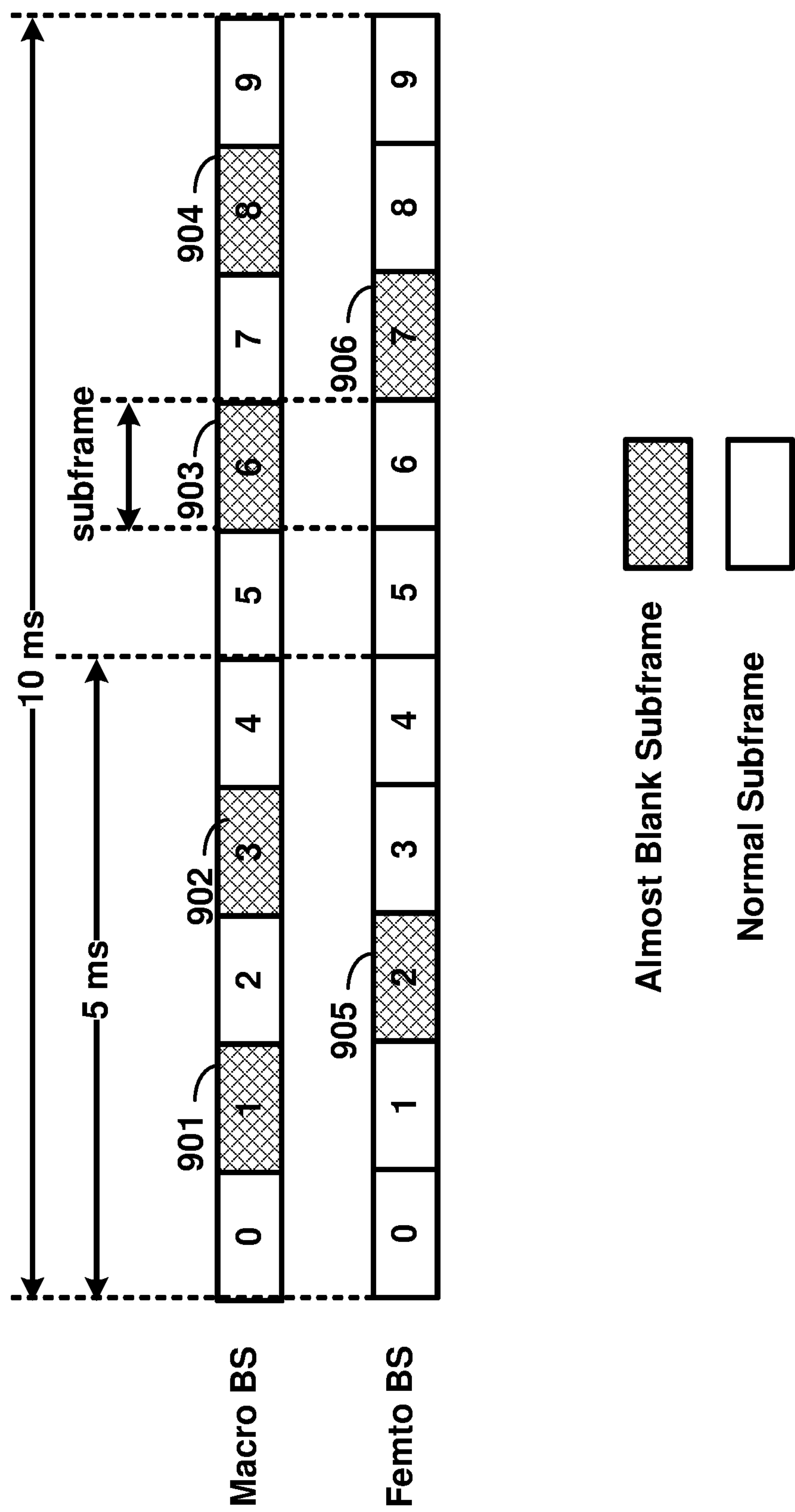
FIG. 9 is an example almost blank subframe configuration as per an aspect of an embodiment of the present invention.

Interference coordination using almost blank subframes may be performed by means of a bitmap. Each bit in the bitmap may be mapped to a single subframe. The size of the bitmap may be, for example, 40 bits, resulting in the interference pattern repeating itself after 40 ms. FIG. 9 shows an example almost blank subframe configuration in an example embodiment. In this example embodiment, no data may be scheduled in almost blank subframes (ABS). In another embodiment, data may be scheduled in almost blank subframes at a substantially lower power. Subframes 901, 902, 903, and 904 may be configured as ABS in the macro base station. When a macro base station transmits an almost blank subframe, data may not be scheduled in that subframe (or data may be transmitted at a substantially lower power). This may increase the coverage of the femto or pico base stations close to that macro base station. Subframes 905 and 906 may be configured as ABS in the femto base station. When the femto base station transmits an almost blank subframe, data may not be scheduled in that subframe (or data may be transmitted at a substantially lower power). This may increase coverage allowed for the macro base station or the neighboring femto base stations. In the example of FIG. 9, the almost blank subframe pattern may be repeated every 10 msec. This is just an example and various configurations may be possible. The almost blank subframe configuration may be changed dynamically according to load and traffic, time of the day, or many other parameters. In an example embodiment, based on the data traffic demand, the pattern may change as often as every 40 ms. The communication between nodes may be peer to peer. Or it may be in a master-slave relationship. The node creating dominant interference conditions may control which resources may be used to serve wireless devices in the cell range extension area. In an example scenario, a macro base station may be a master, and a pico base station may be a slave since cell range expansion would most frequently be established for pico base stations. The cell range expansion may be desirable for a macro base station as well. A use case for cell range expansion at the macro base station may be to reduce the number of handovers. In a scenario with a large number of high-mobility users, the number of handovers in the network may become a problem, for example when in the deployment of pico base stations the cells become small. The same resource partitioning schemes may then be utilized to allow high mobility macro wireless devices to remain attached to a macro-cell while deep inside coverage of a pico-cell. In this case, the pico base station may restrict scheduling data traffic on some resources, allowing coverage for high-mobility macro wireless devices.

According to some of the various aspects of embodiments, subframe resource partitioning may create an interference pattern that may require a new radio resource measurement paradigm. As dominant interference may potentially vary from one subframe to the other, in order to ensure radio resource management measurement accuracy, it may be needed to restrict measurements to a desired set of subframes. In an example embodiment, it may be desirable to define anchor interference-protected resources that may be utilized for radio resource measurement. The 40-bit bitmap may include indications of which subframes may have static protection from interference and therefore may be suitable for measurements. The remaining resources may change more often.

According to some of the various aspects of embodiments, the serving base station may inform a wireless device of the set of subframes to which the wireless device measurement may be restricted. A set of subframes may be configured for radio link monitoring and to check if the current connection is reliable enough. The same or a different set of subframes may be introduced for radio resource management, for example, a handover decision. An additional set of subframes may be signaled for the measurement for some neighboring base stations. This configuration may be relatively static and may not change rapidly. Another set of subframes may be configured in the wireless device for channel state information reporting and link adaptation. Two sets of subframes may be signaled to a wireless device for two different channel state information types. For example, one may be for almost blank subframes, and the other may be for normal subframes. This configuration may change dynamically depending on the network configuration.

Figure 10:
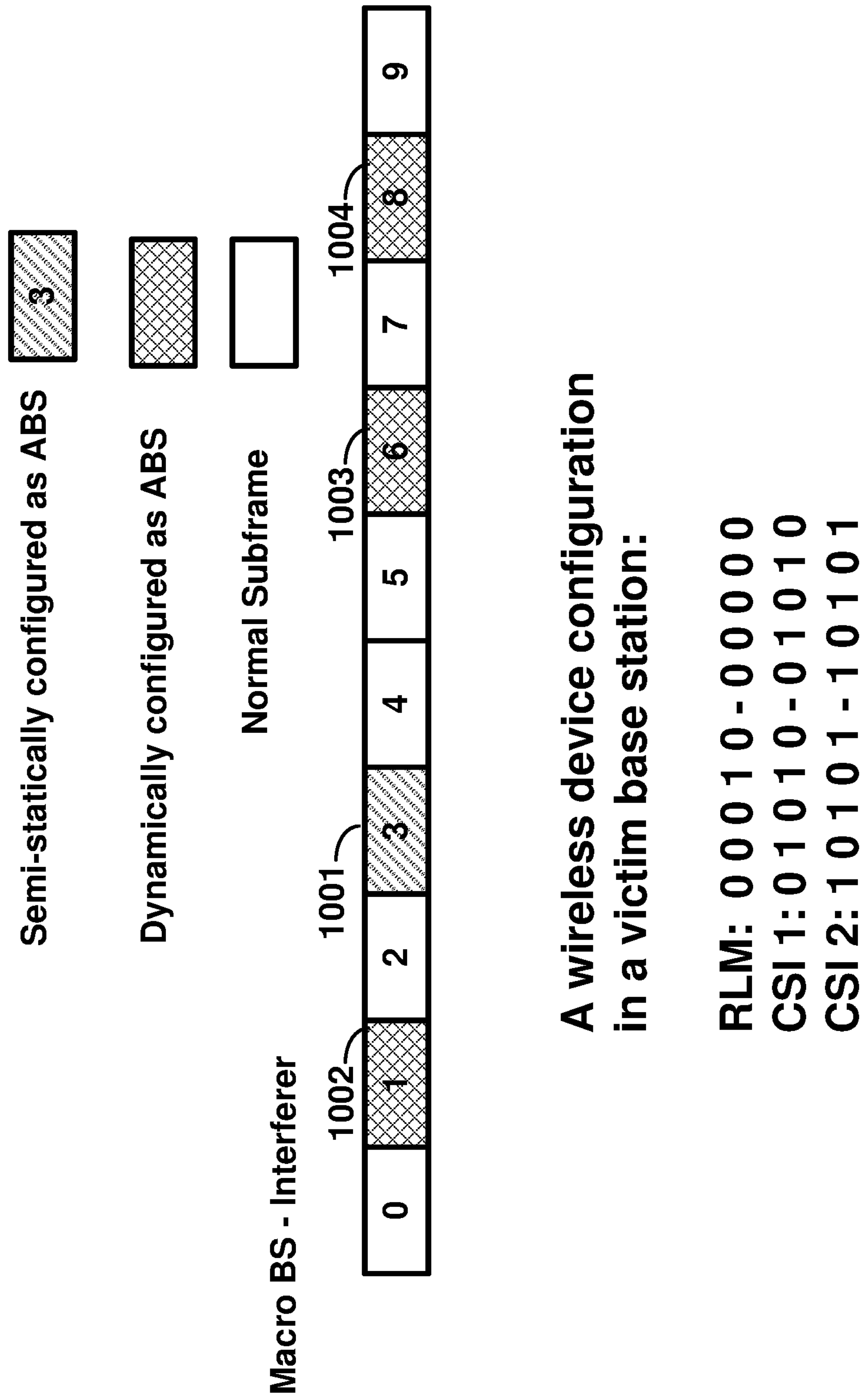
FIG. 10 is a diagram depicting an example wireless device configuration as per an aspect of an embodiment of the present invention.

FIG. 10 illustrates example channel state information bitmaps and an example radio link management bitmap. Subframe 1001 (subframe 3) is semi-statically configured as ABS and therefore it is used for radio link management in a wireless device in a victim base station. Subframes 1002, 1003, and 1004 (subframes 1, 6, and 8) are dynamically configured as ABS subframes. CSI bitmap 1 is used for a first channel state information measurement and CSI bitmap 2 is used for a second channel state information measurement. This is an example, and various configurations and bitmap lengths, such as 40 bits or 70 bits, may also be supported. When there is no X2 interface, a static OAM-based or similar solution may be employed. The same principle of extending coverage of one cell into the area covered by the other may be achieved. In this case, it may be the macro-cell service that needs to be extended into an area covered by the closed femto-cell.

The resource partitioning may reduce interference from the data channel. Interference from the acquisition channels and CRS signal may remain, since these signals may be transmitted for backward compatibility reasons. Subframe time shifting may be utilized in FDD systems to reduce collision of the acquisition channels between base stations of different power classes that require partitioning, but may not be employed in TDD systems. Interference mitigation for the acquisition channels may be needed for cell range expansion to enable the wireless device to detect and acquire a weak cell and then measure and feedback the measurement report to the network, which may be needed for handover and cell range expansion.

CRS interference mitigation may improve system performance. CRS interference may degrade turbo code performance and the overall signal-to-interference-plus-noise radio (SINR). Therefore, the potential gains of cell range expansion may be reduced. Given that acquisition channels and CRS may be broadcast at high power targeting wireless devices at the cell edge, a robust wireless device solution is feasible.

One of the various rationales for the wireless device solution for the acquisition signals and CRS interference mitigation is that interference may be estimated and subtracted so that in the end it may not represent significant interference. Acquisition channels may be transmitted at the same location in cells, which means that the acquisition channels interference may comprise acquisition channels from neighboring interfering cells. This structure may lend itself to a design of an interference canceller. A wireless device receiver first may decode the strongest signal, may perform channel gain estimation toward the interfering cell, may cancel the interfering signal, and may continue the procedure until acquisition channels of the serving cell are acquired.

A similar procedure may be performed to remove CRS interference. The difference may be that CRS tones may also interfere with data tones since interference between CRS tones between high-power and low-power nodes may be reduced by CRS tone shifting. The procedure may be similar. If strong CRS interference is detected, and after the channel gain toward the interfering cell is estimated, the CRS signal may be cancelled. The procedure may be repeated until interfering signals are subtracted.

RRC messages are used to configure wireless device configuration parameters related to almost blank configuration and measurements. An example RRC message configuration in an example embodiment is described in the following paragraphs. A subframe pattern bitmap may indicate the time domain measurement resource restriction pattern for primary or secondary carrier measurements (RSRP, RSRQ and the radio link monitoring). The bitmap length may be, for example, 40 bits. Another subframe bitmap may configure neighbor measurement patterns. A neighbor measurement bitmap along with the list of cells for which the neighbor measurement bitmap is applied may be transmitted to the wireless device. If the list of cells is not included, the wireless device may apply time domain measurement resource restrictions for neighbor cells. Time domain measurement resource restriction patterns may be applicable to neighbor cell RSRP and RSRQ measurements on a carrier frequency indicated by RRC. In an example embodiment, two CSI subframe pattern configuration bitmaps may be transmitted to the wireless device. Each bit map may be 40 bits long. The CSI configuration may include a channel quality index, a rank indicator, a precoding matrix indicator, a combination thereof, or the like.

A base station may broadcast an ABS subframe configuration employing MBSFN (multi-cast, broadcast, single frequency network) subframe configuration broadcast or unicast messages. An example broadcast message is an RRC system information block. MBSFN or ABS subframe configurations may include a radio frame allocation period, a radio frame allocation offset, a subframe allocation bitmap, any combination of these parameters, or the like. A radio frame allocation period may be 1, 2, 4, 8, 16 or 32 frames. A radio frame allocation offset may be a number between 1 to 7 subframes. A subframe allocation bitmap may be for one frame or four frames. Radio frames that contain MBSFN/ABS subframes may occur when equation (SFN mod radio Frame Allocation Period=radio Frame Allocation Offset) is satisfied. Values 1 and 2 may not be applicable to radio frame allocation period when four Frames are used.

According to some of the various aspects of embodiments, a subframe allocation bitmap may define the subframes that are allocated for MBSFN within the radio frame allocation period defined by the radio frame allocation period and the radio frame allocation offset. A subframe allocation bitmap for one frame may be six bits long and for four frames may be 24 bits long. In a bit-map indicating MBSFN/ABS subframe allocation in four consecutive radio frames, a "1" may denote that the corresponding subframe is allocated for MBSFN/ABS. The bitmap may be interpreted as follows: For FDD: Starting from the first radio frame and from the first/leftmost bit in the bitmap, the allocation may apply to subframes #1, #2, #3, #6, #7, and #8 in the sequence of the four radio-frames. For TDD: Starting from the first radio frame and from the first/leftmost bit in the bitmap, the allocation applies to subframes #3, #4, #7, #8, and #9 in the sequence of the four radio-frames. The last four bits may not be used. Uplink subframes may not be allocated.

Other example configurations may be implemented. For example, an MBSFN subframe configuration may be used to introduce ABS subframes and subframes used for scheduling release 10 or above wireless devices. For example, an MBSFN configuration may introduce subframe 1, 3, 6 and 8 as MBSFN subframes in a frame. Then MBSFN subframe 1 may be used for scheduling release 10 or above wireless devices, and MBSFN subframe 3, 6, and 8 may be used as almost blank subframes. Therefore, as seen in this example, MBSFN configuration may indicate other types of subframes in addition to almost blank subframes. In another configuration, a base station may use one or many of MBSFN subframes for broadcasting or multicasting services. In a typical scenario, in which MBSFN may be configured, for example, for four frames, with a period of 40 msec, various configurations for combining ABS, MBSFN, and release 10 or above subframes may be possible. In this specification, ABS subframes may be called special subframes.

According to some of the various aspects of embodiments, special subframes may be configured for the primary carrier (cell) as well as one or more secondary carriers (cells). The configuration parameters for the measurement parameters of the secondary carrier(s) may employ the bitmaps with the same length and format of the configuration parameters of the primary carrier. In an example embodiment, the configuration parameters of special subframes for one or more secondary carriers may be the same as the configuration parameters for the special subframe configuration of the primary carrier.

According to some of the various aspects of embodiments, non-backward compatible carriers may be configured with special subframes. In a non-backward compatible carrier special subframe, no common reference signal may be transmitted during the special subframe. Or, data and reference signals in a non-backward compatible carrier special subframe may be transmitted at a substantially lower power to ensure that no interference (to other cells) is observed during the special subframe.

Example embodiments of the invention may enable special subframe allocation in wireless communication systems. Other example embodiments may comprise a non-transitory tangible computer readable media comprising instructions executable by one or more processors to cause special subframe allocation in wireless communication systems. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable special subframes allocation. The device may include processors, memory, interfaces, and/or the like. Other example embodiments may comprise communication networks comprising devices such as base stations, wireless devices (or user equipment: UE), servers, switches, antennas, and/or the like.

A network may comprise a plurality of base stations. Transmission time may be divided into a plurality of frames. Each frame in the plurality of frames may further be divided into a plurality of subframes. A first base station may comprise a communication interface, a processor, and a memory storing instructions that, when executed, cause the first base station to perform certain functions. According to some of the various aspects of embodiments, the first base station may transmit a first message to a plurality of wireless devices in connected mode. The first message may comprise an initial subframe allocation bitmap indicating an initial plurality of subframes. The initial plurality of subframes may comprise an initial plurality of special subframes. After an increase in the number of the plurality of wireless devices or after an increase in the traffic load of the first base station by an amount greater than a load value, the first base station may transmit a second message. The second message may comprise an updated subframe allocation bitmap indicating a second plurality of subframes. The second plurality of subframes may comprise an updated plurality of special subframes. The updated plurality of special subframes may comprise a smaller number of special subframes than the initial plurality of special subframes. During the majority of symbols of a special subframe of a base station, no signal may be transmitted by the base station or signals may be transmitted with substantially lower power compared with transmit power of signals transmitted during a subframe which is not assigned as a special subframe (non-special subframe). Non-special subframes may also be called regular subframes. Data and reference signals during a special subframe may be transmitted at a substantially lower power to ensure that no interference (to other cells) is observed during the special subframe.

According to some of the various aspects of embodiments, the first base station may transmit a first message to a plurality of wireless devices in connected mode. The first message may comprise an initial subframe allocation bitmap indicating an initial plurality of subframes. The initial plurality of subframes may comprise an initial plurality of special subframes. After a decrease in the number of the plurality of wireless devices or after a decrease in the traffic load of the first base station by an amount greater than a load value, the first base station may transmit a second message. The second message may comprise an updated subframe allocation bitmap indicating a second plurality of subframes. The second plurality of subframes may comprise an updated plurality of special subframes. The updated plurality of special subframes may comprise a greater number of special subframes than the initial plurality of special subframes. During the majority of symbols of a special subframe of a base station, no signal may be transmitted by the base station or signals may be transmitted with substantially lower power compared with transmit power of signals transmitted during a subframe which is not assigned as a special subframe.

According to some of the various aspects of embodiments, the first base station may transmit a first message to a plurality of wireless devices in connected mode. The first message may comprise at least one of the following: a) an initial subframe allocation repetition period in terms of n frames, wherein n is an integer greater than or equal to one, b) an initial subframe allocation offset i, wherein i is an integer greater than or equal to zero, and c) an initial subframe allocation bitmap indicating an initial plurality of subframes in k frames, wherein k is an integer and $1 \leq k \leq n$. The bitmap may apply to subframes in k frames starting from frames whose SFN meets SFN mod n=i criterion. The initial plurality of subframes may comprise an initial plurality of special subframes.

After an increase or decrease in the number of the plurality of wireless devices or after an increase or decrease in the traffic load of the first base station by an amount greater than a load value, the first base station may transmit a second message. The second message may comprise at least one of the following: a) the initial subframe allocation repetition period, b) the initial subframe allocation offset, and an updated subframe allocation bitmap indicating a second plurality of subframes. The second plurality of subframes may comprise an updated plurality of special subframes. The updated plurality of special subframes may comprise a smaller or greater number (respectively corresponding to increase or decrease in the number of wireless devices or the traffic load) of special subframes than the initial plurality of special subframes. During most symbols of a special subframe of a base station, no signal may be transmitted by the base station or signals may be transmitted with substantially lower power compared with transmit power of signals transmitted during a subframe which is not assigned as a special subframe.

According to some of the various aspects of embodiments, a first base station may transmit a first message to a first plurality of wireless devices in connected mode. The first message may comprise an initial first subframe allocation bitmap indicating an initial first plurality of subframes. The initial first plurality of subframes may comprise an initial first plurality of special subframes. Each of at least one second base station may transmit a second message to a second plurality of wireless devices in connected mode. For each of the at least one second base station, the second message may comprise an initial second subframe allocation bitmap indicating an initial second plurality of subframes. The initial second plurality of subframes may comprise an initial second plurality of special subframes. There may be a coverage overlap between the first base station and each of the at least one second base station.

After an increase or decrease in the number of the plurality of wireless devices or after an increase or decrease in the traffic load of the first base station by an amount greater than a load value, the first base station may transmit a third message. The third message may comprise an updated first subframe allocation bitmap indicating an updated first plurality of subframes. The updated first plurality of subframes may comprise an updated first plurality of special subframes. The updated first plurality of special subframes may comprise a smaller or greater number (respectively corresponding to increase or decrease in the number of wireless devices or the traffic load) of special subframes than the initial first plurality of special subframes. Each of the at least one second base station may transmit a fourth message. For each of the at least one second base station, the fourth message may comprise an updated second subframe allocation bitmap indicating an updated second plurality of subframes. The updated second plurality of subframes may comprise an updated second plurality of special subframes. The updated second plurality of special subframes may comprise a greater or smaller number (respectively corresponding to increase or decrease in the number of wireless devices or the traffic load) of special subframes than the initial second plurality of special subframes. During most symbols of a special subframe of a base station, no signal may be transmitted by the base station or signals may be transmitted with substantially lower power compared with transmit power of signals transmitted during a subframe which is not assigned as a special subframe (called non-special subframes or regular subframes).

According to some of the various aspects of embodiments, a network comprises a plurality of base stations. Transmission time may be divided into a plurality of frames. Each frame in the plurality of frames may be assigned a system frame number (SFN) and may be further divided into N subframes. N is an integer greater than one. A first base station may transmit a first message to a first plurality of wireless devices in connected mode. The first message may comprise at least one of the following: a) an initial first subframe allocation repetition period in terms of n frames, wherein n is an integer greater than or equal to one, b) an initial first subframe allocation offset i, wherein i is an integer greater than or equal to zero, and c) an initial first subframe allocation bitmap indicating an initial first plurality of subframes in k frames, wherein k is an integer and $1 \leq k \leq n$. The bitmap may apply to subframes in k frames starting from frames whose SFN meets (SFN mod n=i) criterion. The initial first plurality of subframes may comprise an initial first plurality of special subframes.

Each of at least one second base station may transmit a second message to a second plurality of wireless devices in connected mode. For each of the at least one second base station, the second message may comprise at least one of the following: a) the initial first subframe allocation repetition period, b) the initial first subframe allocation offset, and c) an initial second subframe allocation bitmap indicating an initial second plurality of subframes. The initial second plurality of subframes may comprise an initial second plurality of special subframes. There is a coverage overlap between the first base station and each of the at least one second base station.

After an increase or decrease in the number of the plurality of wireless devices or after an increase or decrease in the traffic load of the first base station by an amount greater than a load value, the first base station may transmit a third message. The third message may comprise an updated first subframe allocation bitmap indicating an updated first plurality of subframes. The updated first plurality of subframes may comprise an updated first plurality of special subframes. The updated first plurality of special subframes may comprise a smaller or greater number (respectively corresponding to increase or decrease in the number of wireless devices or the traffic load) of special subframes than the initial first plurality of special subframes.

Each of the at least one second base station may transmit a fourth message. For each of the at least one second base station, the fourth message may comprise an updated second subframe allocation bitmap indicating an updated second plurality of subframes. The updated second plurality of subframes may comprise an updated second plurality of special subframes. The updated second plurality of special subframes may comprise a greater or smaller (respectively corresponding to increase or decrease in the number of wireless devices or the traffic load) number of special subframes than the initial second plurality of special subframes. During most symbols of a special subframe of a base station, no signal may be transmitted by the base station or signals may be transmitted with substantially lower power compared with transmit power of signals transmitted during a subframe which is not assigned as a special subframe. In a special subframe, a base station transmits a common reference signal only in a control region of the special subframe.

Example embodiments enable dynamic configuration of special subframes and dynamic adaptation of special subframes in one or more base stations to adapt to changes in the traffic load of one or more base stations. Such a dynamic configuration may increase air interface and backhaul overhead. Additional overhead in signaling may include additional RRC messages and additional X2 application protocol messages. The gains in air interface efficiency maybe due to reduction in the special subframes in some of the cells with relatively high load. This may reduce the packet congestion in those cells and reduce packet transmission delay and/or packet loss and may increase cell throughput. Some of the network simulations/analysis shows that the benefits in air interface efficiency gains may be more than the negative impact due to additional overhead. The example embodiments may add additional complexity in network operations, but instead it may increase the overall spectral efficiency in the network. The dynamic operation may be triggered when the load is decreased by an amount greater than a load value or decreases by an amount greater than a load value. Therefore, the operation may be performed selectively, by one or more base stations, and may be communicated to one or more other base stations. This dynamic configuration is different from other methods employed to increase cell capacity. It may require transmission and reception of additional RRC reconfiguration messages to reconfigure the air interface parameters in wireless devices in the coverage area and may require transmission and reception of additional X2 interface messages to other base stations.

The third message and the fourth message may comprise the initial first subframe allocation repetition period and the initial first subframe allocation offset. Base stations in the plurality of second base stations may configure the same set of subframes as the second initial plurality of special subframes. Base stations in the plurality of second base stations may configure the same set of subframes as the second updated plurality of special subframes. n may be equal to $2^j$, wherein j is one of the following numbers: 0, 1, 2, 3, 4, and 5. i may be one of the following numbers: 0, 1, 2, 3, 4, 5, 6, and 7 and i may be smaller than n. k may be equal to one or four. N may be equal to ten. Each base station in the plurality of base stations may comprise at least one carrier.

Each base station in the plurality of base stations may broadcast the system frame number represented by in bits. Each base station in the plurality of base stations may broadcast the most significant bits of the system frame number using a plurality of subcarriers in the in the middle of the frequency band of a carrier on the first subframe of each frame in the plurality of frames in a field in a physical broadcast channel. in may be equal to 10. p may be equal to 8. Each base station in the plurality of base stations may broadcast implicitly the m−p least significant bits of the system frame number by coding the physical broadcast channel over $2^{(m-p)}$ frames. The timing of the coded physical broadcast channel may determine the m−p least significant bits. Each base station in the plurality of base stations may broadcast the same system frame number if the frames are transmitted substantially at the same time. The (m−p) least significant bits of the system frame number may be broadcast by encoding control blocks in the physical broadcast channel over $2^{(m-p)}$ frames. Sequential position of the encoded control blocks determining the (m−p) least significant bits.

For an FDD network, special subframes may be a subset of subframes consisting of subframes number one, two, three, six, seven, and eight in each frame, wherein subframe numbers in each frame start from number zero. For a TDD network, special subframes may be a subset of subframes consisting of subframes number three, four, seven, eight and nine in each frame, wherein subframe numbers in each frame start from number zero. The first message, the second message, and the fourth message may be broadcasted using physical downlink shared channel.

The first message, the second message, and the fourth message may be broadcasted using system information blocks. A base station in the plurality of base stations may not transmit unicast data in a subframe that is assigned by the base station as the special subframe. A base station in the plurality of base stations may not transmit unicast data to a release 8 or 9 LTE wireless device in a subframe that is assigned by the base station as the special subframe.

The first base station may transmit a plurality of unicast messages to a subset of the first plurality of wireless devices. The plurality of unicast messages may configure at least one of the following: a) measurement subframes of a primary carrier for the subset of the first plurality of wireless devices, and b) measurement subframes of a plurality neighboring carriers for the subset of the first plurality of wireless devices. The traffic carried by the first base station may increase, when the number of the first plurality of wireless devices increases. Traffic load of the first base station may increase, when the number of the first plurality of wireless devices increases.

There may be an X2 interface between the first base station and each of the second plurality of base stations. After an increase in the number of the first plurality of wireless devices, the first base station may transmit a message to each of the at least one second base station. The message may comprise a first pattern bitmap indicating the updated first special subframe allocation. The message may further comprise a second pattern bitmap indicating a subset of the special subframes indicated by the first pattern bitmap used to configure measurement parameters for a subset of the second plurality of wireless devices. Each of the at least one second base station may acknowledge the receipt of the message.

The first base station may have a substantially higher transmit power than each of the at least one second base station. The updated first plurality of special subframes may be a subset of the initial first plurality of special subframes. The initial second plurality of special subframes may be a subset of the updated second plurality of special subframes. Each of the plurality of second base stations may configure the initial and updated second plurality of special subframes based on messages received from the first base station on an X2 interface between the first base station and each of the plurality of second base stations. The first plurality of subframes may further comprise subframes used for broadcasting or multicasting, or subframes used for scheduling LTE release 10 and beyond devices.

The second plurality of subframes may further comprise subframes used for broadcasting or multicasting, or subframes used for scheduling LTE release 10 or beyond wireless devices. The initial first subframe allocation bitmap, the updated first subframe allocation bitmap, the initial second subframe allocation bitmap, and the updated second subframe allocation bitmap may be 6 bits or 24 bits long. An example of special subframes is almost blank subframe.

A network may comprise a plurality of base stations. A first base station may transmit radio signals at a substantially different power than a plurality of second base stations. This may result in the first base station being in a different power class. The first base station may be of a different base station type than the second base stations. The base station type, for example, may be one of the following: femto base station type, pico base station type, micro base station type, macro base station type, relay type, and/or the like. Transmission time may be divided into a plurality of frames, and each frame in the plurality of frames may further be divided into a plurality of subframes. Each of the plurality of second base stations and the first base station may provide overlapping coverage in at least a region in the service area of the network. In an example embodiment, each of the plurality of second base stations may configure a second plurality of special subframes. During the majority of (most) symbols of a special subframe of a base station, no signal may be transmitted by the base station or signals may be transmitted with substantially lower power compared with transmit power of signals transmitted during a subframe which is not assigned as a special subframe. The base stations in the plurality of second base stations may configure the same set of subframes as the second plurality of special subframes.

According to some of the various aspects of embodiments, each of the plurality of second base stations may transmit a second message to a second plurality of wireless devices in connected mode. For each of the plurality of second base stations, the second message may comprise a second subframe allocation bitmap indicating a second plurality of subframes. The second plurality of subframes may comprise a second plurality of special subframes. During most symbols of a special subframe of a base station, no signal may be transmitted by the base station or signals may be transmitted with substantially lower power compared with transmit power of signals transmitted during a subframe which is not assigned as a special subframe (may be called non-special subframes or regular subframes). The base stations in the plurality of second base stations may configure the same set of subframes as the second plurality of special subframes.

According to some of the various aspects of embodiments, the first base station may transmit a first message to a first plurality of wireless devices in connected mode. The first message may comprise a first subframe allocation bitmap indicating a first plurality of subframes. The first plurality of subframes may comprise a first plurality of special subframes. Each of the plurality of second base stations may transmit a second message to a second plurality of wireless devices in connected mode. For each of the plurality of second base stations, the second message may comprise a second subframe allocation bitmap indicating a second plurality of subframes. The second plurality of subframes may comprise a second plurality of special subframes. All the base stations in the plurality of second base stations may configure the same set of subframes as the second plurality of special subframes. During most symbols of a special subframe of a base station, no signal may be transmitted by the base station or signals may be transmitted with substantially lower power compared with transmit power of signals transmitted during a subframe which is not assigned as a special subframe. The first plurality of special subframes and the second plurality of special subframes may not substantially overlap in time (may be two sets of disjoint subframes or equally may not share the same subframe).

According to some of the various aspects of embodiments, each of the plurality of second base stations may transmit a second message to a second plurality of wireless devices in connected mode. For each of the plurality of second base stations, the second message may comprise at least one of the following: a) a second subframe allocation repetition period in terms of n frames, wherein n is an integer greater than or equal to one, b) a second subframe allocation offset, i, wherein i is an integer greater than or equal to zero, and c) a second subframe allocation bitmap indicating a second plurality of subframes in k frames, wherein k is an integer and $1 \leq k \leq n$. The bitmap may apply to subframes in k frames starting from frames whose SFN meets SFN mod n=i criterion. The second plurality of subframes may comprise a second plurality of special subframes. During most symbols of a special subframe of a base station, no signal may be transmitted by the base station or signals may be transmitted with substantially lower power compared with transmit power of signals transmitted during a subframe which is not assigned as a special subframe. The base stations in the plurality of second base stations may configure the same second subframe allocation repetition period, the same second subframe allocation offset, and the same set of subframes as the second plurality of special subframes.

According to some of the various aspects of embodiments, transmission time may be divided into a plurality of frames, and each frame in the plurality of frames may be assigned a system frame number (SFN) and may further be divided into N subframes. N is an integer greater than one. The first base station may transmit a first message to a first plurality of wireless devices in connected mode. The first message may comprise at least one of the following: a) a first subframe allocation repetition period in terms of n frames, wherein n is an integer greater than or equal to one, b) a first subframe allocation offset, i, wherein i is an integer greater than or equal to zero, and c) a first subframe allocation bitmap indicating a first plurality of subframes in k frames, wherein k is an integer and $1 \leq k \leq n$. The bitmap may apply to subframes in k frames starting from frames whose SFN meets SFN mod n=i criterion. The first plurality of subframes may comprise a first plurality of special subframes.

Each of the plurality of second base stations may transmit a second message to a second plurality of wireless devices in connected mode. For each of the plurality of second base stations, the second message may comprise at least one of the following: a) the first subframe allocation repetition period, b) the first subframe allocation offset, and c) a second subframe allocation bitmap indicating a second plurality of subframes. The second plurality of subframes may comprise a second plurality of special subframes. All the base stations in the plurality of second base stations may configure the same set of subframes as the second plurality of special subframes. During most symbols of a special subframe of a base station, no signal may be transmitted by the base station or signals may be transmitted with substantially lower power compared with transmit power of signals transmitted during a subframe which is not assigned as a special subframe. The first plurality of special subframes and the second plurality of special subframes may be disjoint.

Example embodiments enable configuration of special subframes in one or more base stations. Changes in special subframe allocation in one base station may result in changes in special subframe allocation of a plurality of base stations. Such a configuration may increase air interface and backhaul overhead. Additional overhead in signaling may include additional RRC messages and additional X2 application protocol messages. The gains in air interface efficiency maybe due to reduction in inter-cell interference in the network. This may reduce interference and may reduce packet loss and may increase cell throughput. Some of the network simulations/analyses show that the benefits in air interface efficiency gains may be more than the negative impact due to additional overhead. The example embodiments may add additional complexity in network operations; instead it may increase the overall spectral efficiency in the network. Novel constraints are introduced in special subframe allocation among base stations of different types. A change in special subframe allocation of a high power base station may be communicated to many other low power base stations. Required communications between base stations are introduced to satisfy these constraints. These novel constraints and required communications may increase network complexity; instead they may increase network performance. Therefore, the operation may be performed selectively, by one or more base stations, and may be communicated to one or more other base stations. This dynamic configuration is different from other methods employed to increase cell capacity. It may require transmission and reception of additional RRC reconfiguration messages to reconfigure the air interface parameters in wireless devices in the coverage area and may require transmission and reception of additional X2 interface messages to other base stations.

In a special subframe, a base station may transmit a common reference signal only in a control region of the special subframe. n may be equal to $2^j$, wherein j is one of the following numbers: 0, 1, 2, 3, 4, and 5. i may be one of the following numbers: 0, 1, 2, 3, 4, 5, 6, and 7. i may be smaller than n. k may be equal to one or four. N may be equal to ten. Each base station in the plurality of base stations may comprise at least one carrier. Each base station in the plurality of base stations may broadcast the system frame number represented by m bits. Each base station in the plurality of base stations may broadcast the p most significant bits of the system frame number using a plurality of subcarriers in the in the middle of the frequency band of a carrier on the first subframe of each frame in the plurality of frames in a field in a physical broadcast channel. m may be equal to 10. p may be equal to 8. Each base station in the plurality of base stations may broadcast implicitly the m−p least significant bits of the system frame number by coding the physical broadcast channel over $2^{(m-p)}$ frames. The timing of the coded physical broadcast channel may determine the m−p least significant bits. Each base station in the plurality of base stations may broadcast the same system frame number if the frames are transmitted substantially at the same time. The (m−p) least significant bits of the system frame number may be broadcast by encoding control blocks in the physical broadcast channel over $2^{(m-p)}$ frames. Sequential position of the encoded control blocks determining the (m−p) least significant bits.

In a FDD system, special subframes may be a subset of subframes consisting of subframes number one, two, three, six, seven, and eight in each frame. Subframe numbers in each frame start from number zero. In a TDD system, special subframes may be a subset of subframes consisting of subframes number three, four, seven, eight and nine in each frame. Subframe numbers in each frame start from number zero. The first message and the second message may be broadcasted using physical downlink shared channel. The first message and the second message may be broadcasted using system information blocks. A base station in the plurality of base stations may not transmit unicast data in a subframe that is assigned by the base station as the special subframe. A base station in the plurality of base stations may not transmit unicast data to a release 8 or 9 LTE wireless device in a subframe that is assigned by the base station as the special subframe. A base station may transmit a plurality of unicast messages to a subset of the first plurality of wireless devices. The plurality of unicast messages may configure: a) measurement subframes of a primary carrier for the subset of the first plurality of wireless devices, or b) measurement subframes of a plurality neighboring carriers for the subset of the first plurality of wireless devices.

After an increase in the number of the first plurality of wireless devices by an amount greater than a load value, the first base station may decrease the number of special subframes in the first plurality of special subframes. After a decrease in the number of the first plurality of wireless devices by an amount greater than a load value, the first base station may increase the number of special subframes in the first plurality of special subframes. After an increase in the traffic load of the first base station by an amount greater than a load value, the first base station may decrease the number of special subframes in the first plurality of special subframes. After a decrease in the traffic load of the first base station by an amount greater than a load value, the first base station may increase the number of special subframes in the first plurality of special subframes. The traffic carried by the first base station may increase, when the number of the first plurality of wireless devices increases. Traffic load of the first base station may increase, when the number of the first plurality of wireless devices increases.

There may be an X2 interface between the first base station and each of the second plurality of base stations. The first base station may transmit a message to each of the at least one second base station. The message may comprise a first pattern bitmap indicating the first special subframe allocation. The message may further comprise a second pattern bitmap indicating a subset of the special subframes indicated by the first pattern bitmap used to configure measurement parameters for a subset of the second plurality of wireless devices. Each of the at least one second base station acknowledges the receipt of the message. The first base station has a substantially higher transmit power than each of the plurality of second base stations.

Frame and subframe transmission of the first base station and each of the second plurality of base stations may be substantially synchronized. Each of the plurality of second base stations may configure the second plurality of special subframes based on messages received from the first base station on an X2 interface between the first base station and each of the plurality of second base stations. The first plurality of subframes may further comprise subframes used for broadcasting or multicasting, or subframes used for scheduling LTE release 10 and beyond wireless devices. The second plurality of subframes may further comprise subframes used for broadcasting or multicasting, or subframes used for scheduling LTE release 10 or beyond wireless devices. The first subframe allocation bitmap and the second subframe allocation bitmap may be 6 bits or 24 bits long. An example of special subframes is almost blank subframes.

A network comprises a plurality of base stations. Transmission time may be divided into a plurality of frames. Each frame in the plurality of frames may be assigned a system frame number (SFN). In an example embodiment, each base station in the plurality of base stations, in each frame, may transmit the system frame number. Each base station in the plurality of base stations, in each frame, may transmit a synchronization signal indicating a cell ID. The transmission of the synchronization signals may be substantially time aligned among the plurality of base stations. Transmission of the synchronization signal of each base station in the plurality of base stations are substantially time aligned with transmission of other synchronization signals of other base stations in the plurality of base station. All the base stations in the plurality of base stations may transmit the same system frame number in frames that are transmitted substantially at the same time. In an example embodiment, the term substantially may be employed to show that the synchronization may not be perfect due to inherent synchronization errors or inaccuracy in the synchronization mechanism.

In this disclosure, phrases such as “each base station in a plurality of base stations,” “all base station in a plurality of base stations,” or the like refer to select base stations that are similarly configured in a group of base stations. It is possible that there may be more base stations in a network that are configured to perform differently. In those cases, the phrases do not necessarily include those differently configured base stations. Additionally, similar phrases that refer to other devices such as wireless devices, etc. may also have a similar interpretation. For example, in a given network, there may be a base station in the network that is not synchronized with other base stations, and therefore may not be considered in the set of the plurality of base stations.

According to some of the various aspects of embodiments, a base station base station may be configured to communicate a plurality of carriers. The base station may transmit symbols in a sequential series of subframes on the carriers. The base station may configure each of a first set of subframes on a first carrier in the plurality of carriers designated as a special subframe. The base station may enter in a special subframe if the subframe is in a first set of subframes. Some examples of special subframe configuration are presented in the specifications. The base station may transmit at least one unicast radio resource control message to a wireless device. The at least one unicast radio resource control message may be configured to cause configuration of a second carrier in the plurality of carriers in the wireless device. In an example embodiment, the at least one unicast radio resource control message may comprising at least one of the followings: a) an index identifying the second carrier frequency, b) at least one physical layer parameter, c) at least one measurement parameter, d) other configuration parameters of the second carrier, e) a combination of some of the above parameters.

Currently, special subframes are only introduced for the primary carrier. Configuring special subframe for secondary carriers may introduce many advantages. It would allow interference control in heterogeneous networks on many carriers and may improve spectral efficiency. Since primary carriers are configured as a wireless device specific parameter, then a first carrier may be configured as a primary carrier for a first wireless device and a second carrier may be configured as a primary carrier for a second wireless device. This may introduce issues if special subframes are only supported for primary carrier by the base station. In an example configuration, a base station may need to configure special subframes in secondary carriers. To address special subframe configuration issues and improving system performance methods and systems for configuring special subframe for secondary carrier(s) is introduced. The base station may configure a second carrier to enter special subframes. The base station may configure the second carrier to enter a special subframe for every subframe in which: the first carrier enters a special subframe, the second carrier is configured, and the second carrier is activated. A majority of symbols of each special subframe have: no signal being transmitted by the base station; or signals being transmitted by the base station at a special subframe power level that is substantially lower than a transmit power during a non-special subframe.

According to some of the various aspects of embodiments, a base station may transmit a first unicast control message on a first carrier. The first unicast control message may be configured to cause configuration of transmission parameters of the first carrier in a wireless device. The base station may transmit at least one second unicast control message configured to cause configuration of measurement parameters of a second carrier in the wireless device. The at least one second unicast control message may comprise at least one of the following: a) a first measurement subframe allocation bitmap, b) a second measurement subframe allocation bitmap, c) one or more first parameters, d) one or more channel state information measurement resource parameters, e) one or more second parameters, f) a combination of the above.

The first measurement subframe allocation bitmap may be configured to cause configuration of a first plurality of measurement subframes of the second carrier of the wireless device. The second measurement subframe allocation bitmap may be configured to cause configuration of a second plurality of measurement subframes of the second carrier of the wireless device. The second plurality of measurement subframes may exclude subframes in the first plurality of measurement subframes. The one or more first parameters may identify a channel state information transmission resource. Channel state information transmission resource are included in PUCCH radio resources are configured for each wireless device connected to the base station. The resources may include SC—for example, OFDM uplink resources, and/or other PUCCH uplink transmission parameters. The one or more second parameters may identify a physical uplink control channel format. The PUCCH format may include coding methods, transmission format, and other PUCCH parameters. PUCCH format is used to create PUCCH signal for uplink transmission in PUCCH radio resources assigned to the wireless device.

The base station may receive channel state information on the channel state information transmission resource from the wireless device on the first carrier employing the physical uplink control channel format. The channel state information may comprise first channel state information and second channel state information. The first channel state information may be measured on a first plurality of OFDM subcarriers of the second carrier on one or more of the first plurality of measurement subframes. The first plurality of OFDM subcarriers may be determined, at least in part, by the one or more channel state information measurement resource parameters. The second channel state information may be measured on a second plurality of OFDM subcarriers of the second carrier on one or more of the second plurality of measurement subframes. The second plurality of OFDM subcarriers may be determined, at least in part, by the one or more measurement resource parameters.

The one or more channel state information measurement resource parameters may identify zero power or non-zero power CSI-RS transmission resources. CSI-RS signal may include OFDM symbols and subcarriers on which CSI-RS signals periodically transmitted. Zero power CSI-RS may be used for interference calculation in order to estimate channel state information. The base station may, for example, rate match or puncture data and transmit it PUSCH resources not including zero power CSI-RS radio resources. The base station may not transmit signals on zero power CSI-RS radio resources. For example, for transmission mode ten in LTE release 11, CSI-RS may be employed, at least in part, for estimating channel state information. Channel state information measurement resource may further include cell-specific reference signal (CRS) transmitted by the base station. In another example, in at least one of the LTE transmission modes one to five, CRS may be employed, at least in part, to estimate channel state information. CRS signal may be determined based on cell ID.

The base station may transmit a plurality of data packets to the wireless device on the second carrier. The plurality of data packets may be encoded and modulated based, at least in part, on the first and second channel state information.

According to some of the various aspects of embodiments, a base station may transmit a first unicast control message on a first carrier. The first unicast control message may be configured to cause configuration of transmission parameters of the first carrier of a wireless device. The base station may transmit at least one second unicast control message configured to cause configuration of measurement parameters of a second carrier in the wireless device. The at least one second unicast control message may comprise a first measurement subframe allocation bitmap and a second measurement subframe allocation bitmap. A first measurement subframe allocation bitmap may be configured to cause configuration of a first plurality of measurement subframes of the second carrier of the wireless device. The second measurement subframe allocation bitmap may be configured to cause configuration of a second plurality of measurement subframes of the second carrier of the wireless device.

The base station may receive first channel state information and second channel state information from the wireless device. The first channel state information may be measured on a first plurality of OFDM subcarriers of the second carrier on the first plurality of measurement subframes. The second channel state information may be measured on a second plurality of OFDM subcarriers of the second carrier on the second plurality of measurement subframes. The base station may transmit a plurality of data packets to the wireless device on the second carrier. The plurality of data packets may be encoded and modulated based, at least in part, on the first and second channel state information.

According to some of the various aspects of embodiments, a wireless device may be configured to communicate a plurality of carriers transmitting symbols in a sequential series of subframes. The wireless device may receive a first unicast control message on a first carrier. The first unicast control message may be configured to cause configuration of transmission parameters of the first carrier in the wireless device. The wireless device may receive at least one second unicast control message causing configuration of measurement parameters of a second carrier in the wireless device. The at least one second unicast control message may comprise at least one of: a) a first measurement subframe allocation bitmap, b) a second measurement subframe allocation bitmap, c) one or more first parameters, d) one or more channel state information measurement resource parameters, e) one or more second parameters, and/or f) a combination of the above.

The first measurement subframe allocation bitmap may be configured to cause configuration of a first plurality of measurement subframes of the second carrier of the wireless device. The second measurement subframe allocation bitmap may be configured to cause configuration of a second plurality of measurement subframes of the second carrier of the wireless device. The second plurality of measurement subframes may exclude subframes in the first plurality of measurement subframes. The one or more first parameters identifying a channel state information transmission resource. The one or more second parameters identifying a physical uplink control channel format.

The wireless device may transmit channel state information on the channel state information transmission resource to a base station on the first carrier employing the physical uplink control channel format. The channel state information may comprise first channel state information and second channel state information. The wireless device may receive a plurality of data packets from the base station on the second carrier. The plurality of data packets may be encoded and modulated based, at least in part, on the first and second channel state information.

The base station may cause activation of the second carrier in the wireless device by transmitting a media access control activation command before receiving the channel state information. The base station may receive the channel state information on a physical uplink shared channel, when the channel state information is appended to a data packet transmitted in the uplink. The base station may configure a first set of subframes on the first carrier as special subframes. A majority of symbols of each special subframe may have: a) no signal being transmitted by the base station; or b) signals being transmitted at a special subframe power level that is substantially lower than a transmit power during a non-special subframe.

The at least one second unicast control message may be configured to cause configuration of cross carrier scheduling for the wireless device. The cross carrier scheduling configuration may indicate that the first carrier carries scheduling information for packets transmitted to the wireless device on a data channel of the second carrier in the plurality of carriers. During the time the cross carrier scheduling is configured and the second carrier is activated, when the base station configures the first carrier to enter a special subframe, the base station may configure the second carrier to enter a special subframe. During the time the second carrier is configured and activated, when the base station configures the first carrier to enter a special subframe, the base station may configure the second carrier to enter a special subframe. The base station may transmit a common reference signal only in a control region of the special subframe. The at least one second unicast control message may configure measurement subframes of a plurality neighboring carriers for the wireless device.

The base station may configure a first set of subframes on the first carrier as special subframes. A majority of symbols of each special subframe have: no signal being transmitted by the base station; or signals being transmitted by the base station at a special subframe power level that is substantially lower than a transmit power during a non-special subframe. The at least one second unicast control message may cause configuration of cross carrier scheduling for the wireless device. The cross carrier scheduling configuration may indicate that the first carrier carries scheduling information for packets received from the base station on a data channel of the second carrier in the plurality of carriers. During the time the cross carrier scheduling is configured and the second carrier is activated, when the first carrier enters a special subframe, the second carrier may enter a special subframe. During the time the second carrier is configured and activated, when the first carrier enters a special subframe, the second carrier may enter a special subframe.

According to some of the various aspects of embodiments, a base station may configure a first set of subframes on a first carrier in the plurality of carriers designated as special subframes. The base station may transmit at least one unicast radio resource control message to a wireless device. The at least one unicast radio resource control message may be configured to cause configuration of a second carrier. The at least one unicast radio resource control message may be configured to cause configuration of cross carrier scheduling for the wireless device. The cross carrier scheduling configuration may indicate that the first carrier carries scheduling information for packets transmitted to the wireless device on a data channel of the second carrier. The first carrier may carry scheduling information on PDCCH or enhanced PDCCH channel. The data channel may be downlink shared channel and/or uplink shared channel.

The at least one unicast radio resource control message may comprise at least one of the following: a) an index identifying a frequency of the second carrier, b) at least one physical layer parameter of the second carrier, c) at least one measurement parameter of the second carrier. The base station may configure the second carrier to enter a special subframe for every subframe in which: the first carrier enters a special subframe, the cross carrier scheduling is configured, and the second carrier is activated. This mechanism would allow an efficient of resources of carriers when special subframes are configured. When the carrier carrying PDCCH scheduling packet for the second carrier is in a special subframe, then it may not be able to efficiently schedule packets in the second carrier. It would be efficient to configure the second carrier as special subframe as well. Then the PDCCH resources in special subframes of the first carrier could be reduced. This may result of less PDCCH interference by an aggressor cell to other cells in a heterogeneous network. In an example embodiment of the invention, base station may not transmit in a special subframe of the first carrier PDCCH packets for packets transmitted on the second carrier. Since the second carrier may be configured as special subframe in the subframe that first carrier is configured as special subframe.

According to some of the various aspects of embodiments, a base station may configure a first set of subframes on a first carrier in the plurality of carriers designated as special subframes. The base station may transmit at least one unicast radio resource control message to a wireless device. The at least one unicast radio resource control message may be configured to cause configuration of cross carrier scheduling for a wireless device. The cross carrier scheduling configuration may indicate that the first carrier carries scheduling information for packets transmitted to the wireless device on a data channel of a second carrier in the plurality of carriers. The base station may configure the second carrier to enter a special subframe for every subframe in which: the first carrier enters a special subframe, the cross carrier scheduling is configured, and the second carrier is activated.

According to some of the various aspects of embodiments, the second carrier may enter special subframes in other subframes in addition to the subframes indicates above. The at least one unicast radio resource control message may further comprise configuration parameters identifying a second set of subframes on the second carrier designated as special subframes. The first set of subframes may be a subset of the second set of the subframes. The at least one unicast radio resource control message may be transmitted on the first carrier. The at least one unicast radio resource control message may be configured to further cause configuration of measurement parameters of the second carrier for the wireless device. The measurement configuration may comprise at least: a) a first measurement subframe allocation bitmap configuring a first plurality of measurement subframes of the second carrier; and b) a second measurement subframe allocation bitmap configuring a second plurality of measurement subframes of the second carrier. The second plurality of measurement subframes may exclude subframes in the first plurality of measurement subframes.

The base station may receive first channel state information and second channel state information from the wireless device. The first channel state information may be measured on a first plurality of OFDM subcarriers of the second carrier on the first plurality of measurement subframes. The second channel state information may be measured on a second plurality of OFDM subcarriers of the second carrier on the second plurality of measurement subframes.

According to some of the various aspects of embodiments, the base station may transmit a plurality of data packets to the wireless device on the second carrier. The plurality of data packets encoded and modulated based, at least in part, on the first second channel state information and the second channel state information. The measurement configuration further may comprise: a) one or more first parameters identifying a channel state information transmission resource, b) one or more channel state information measurement resource parameters, and c) one or more second parameters identifying a physical uplink control channel format.

According to some of the various aspects of embodiments, the base station may receive channel state information on the channel state information transmission resource from the wireless device on the first carrier. The base station may receive the channel state information employing the physical uplink control channel format. The channel state information may comprise first channel state information and second channel state information. The first channel state information may be measured on a first plurality of OFDM subcarriers of the second carrier on one or more of the first plurality of measurement subframes. The first plurality of OFDM subcarriers may be determined, at least in part, by the one or more channel state information measurement resource parameters. The second channel state information may be measured on a second plurality of OFDM subcarriers of the second carrier on one or more of the second plurality of measurement subframes. The second plurality of OFDM subcarriers may be determined, at least in part, by the one or more measurement resource parameters. In an example embodiment, the base station may transmit in a special subframe a common reference signal only in a control region of the special subframe. In another example embodiment, the base station may not transmit any common reference signal in a special subframe. The at least one unicast radio resource control message may be configured to further cause configuration of measurement subframes of a plurality neighboring carriers in the wireless device.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

The precoder may receive a block of vectors from the layer mapping and generate a block of vectors to be mapped onto resources on the antenna port(s). Precoding for spatial multiplexing using antenna port(s) with cell-specific reference signals may be used in combination with layer mapping for spatial multiplexing. Spatial multiplexing may support two or four antenna ports and the set of antenna ports used may be $\{0,1\}$ or $\{0, 1, 2, 3\}$. Precoding for transmit diversity may be used in combination with layer mapping for transmit diversity. The precoding operation for transmit diversity may be defined for two and four antenna ports. Precoding for spatial multiplexing using antenna ports with UE-specific reference signals may also, for example, be used in combination with layer mapping for spatial multiplexing. Spatial multiplexing using antenna ports with UE-specific reference signals may support up to eight antenna ports. Reference signals may be pre-defined signals that may be used by the receiver for decoding the received physical signal, estimating the channel state, and/or other purposes.

For antenna port(s) used for transmission of the physical channel, the block of complex-valued symbols may be mapped in sequence to resource elements. In resource blocks in which UE-specific reference signals are not transmitted the PDSCH may be transmitted on the same set of antenna ports as the physical broadcast channel in the downlink (PBCH). In resource blocks in which UE-specific reference signals are transmitted, the PDSCH may be transmitted, for example, on antenna port(s) 15, {7}, {8}, or {7, 8, . . . , v+6}, where v is the number of layers used for transmission of the PDSCH.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula(s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method comprising:

receiving, by a wireless device and for a first carrier, a broadcast comprising radio resource configuration information that indicates a first set of time intervals that are allocated as reduced transmission power time intervals;

receiving, for a second carrier and via one or more control messages to the wireless device, configuration information that indicates:

a second set of time intervals that are allocated as reduced transmission power time intervals; and a plurality of measurement time intervals; and transmitting measurement information, associated with the second carrier, that is based on the plurality of measurement time intervals;

wherein transmission power associated with a reduced transmission power time interval is configured to be lower than transmission power associated with a non-reduced transmission power time interval.

2. The method of claim 1, wherein the plurality of measurement time intervals either:

excludes the second set of time intervals that are allocated as reduced transmission power time intervals; or consists of a subset of the second set of time intervals that are allocated as reduced transmission power time intervals.

3. The method of claim 1, wherein the configuration information further indicates, for the second carrier, a second plurality of measurement time intervals, and further comprising:

transmitting the measurement information based on a first plurality of subcarriers, of the second carrier, in the plurality of measurement time intervals; and transmitting second measurement information based on a second plurality of subcarriers, of the second carrier, in the second plurality of measurement time intervals.

4. The method of claim 1, wherein the configuration information further indicates, for the second carrier, a second plurality of measurement time intervals, and further comprising:

measuring, based on the plurality of measurement time intervals, first measurement information for one or more reduced transmission power time intervals; and measuring, based on the second plurality of measurement time intervals, second measurement information for one or more non-reduced transmission power time intervals.

5. The method of claim 1, further comprising receiving, during a reduced transmission power time interval, one of:

a signal consisting essentially of a common reference signal in a control region; or a downlink signal, wherein:

the downlink signal consists of no data;

the downlink signal does not schedule data for transmission;

the downlink signal does not schedule unicast traffic; or the downlink signal schedules data for transmission at a transmission power that is configured to be lower than the transmission power associated with the non-reduced transmission power time interval.

6. A method comprising:

broadcasting, by a node and for a first carrier, radio resource configuration information that indicates a first set of time intervals that are allocated as reduced transmission power time intervals;

transmitting, for a second carrier and via one or more control messages to a wireless device, configuration information that indicates:

a second set of time intervals that are allocated as reduced transmission power time intervals; and a plurality of measurement time intervals; and receiving measurement information, associated with the second carrier, that is based on the plurality of measurement time intervals;

wherein transmission power associated with a reduced transmission power time interval is configured to be lower than transmission power associated with a non-reduced transmission power time interval.

7. The method of claim 6, wherein the plurality of measurement time intervals comprises:

at least one static measurement time interval that is associated with at least one of radio resource management for the second carrier or radio link management for the second carrier; and at least one dynamic measurement time interval that is associated with channel state information (CSI) measurement for the second carrier.

8. The method of claim 6, wherein the configuration information indicates that the second set of time intervals that are allocated as reduced transmission power time intervals is the same as the first set of time intervals that are allocated as reduced transmission power time intervals.

9. The method of claim 6, wherein:

the first set of time intervals that are allocated as reduced transmission power time intervals is a first set of almost blank subframes of the first carrier; and the second set of time intervals that are allocated as reduced transmission power time intervals is a second set of almost blank subframes of the second carrier.

10. The method of claim 6, wherein the transmitting the configuration information comprises transmitting a unicast control message comprising the configuration information.

11. A wireless device comprising:

one or more processors; and memory storing instructions that, when executed by the one or more processors, cause the wireless device to:

receive, for a first carrier, a broadcast comprising radio resource configuration information that indicates a first set of time intervals that are allocated as reduced transmission power time intervals;

receive, for a second carrier and via one or more control messages to the wireless device, configuration information that indicates:

a second set of time intervals that are allocated as reduced transmission power time intervals; and a plurality of measurement time intervals; and transmit measurement information, associated with the second carrier, that is based on the plurality of measurement time intervals;

wherein transmission power associated with a reduced transmission power time interval is configured to be lower than transmission power associated with a non-reduced transmission power time interval.

12. The wireless device of claim 11, wherein the plurality of measurement time intervals comprises:

at least one static measurement time interval that is associated with at least one of radio resource management for the second carrier or radio link management for the second carrier; and at least one dynamic measurement time interval that is associated with channel state information (CSI) measurement for the second carrier.

13. The wireless device of claim 11, wherein the configuration information indicates that the second set of time intervals that are allocated as reduced transmission power time intervals is the same as the first set of time intervals that are allocated as reduced transmission power time intervals.

14. The wireless device of claim 11, wherein:

the first set of time intervals that are allocated as reduced transmission power time intervals is a first set of almost blank subframes of the first carrier; and the second set of time intervals that are allocated as reduced transmission power time intervals is a second set of almost blank subframes of the second carrier.

15. The wireless device of claim 11, wherein the instructions, when executed by the one or more processors, cause the wireless device to receive the configuration information at least by receiving a unicast control message comprising the configuration information.

16. A node comprising:

one or more processors; and memory storing instructions that, when executed by the one or more processors, cause the node to:

broadcast, for a first carrier, radio resource configuration information that indicates a first set of time intervals that are allocated as reduced transmission power time intervals;

transmit, for a second carrier and via one or more control messages to a wireless device, configuration information that indicates:

a second set of time intervals that are allocated as reduced transmission power time intervals; and a plurality of measurement time intervals; and receive measurement information, associated with the second carrier, that is based on the plurality of measurement time intervals;

wherein transmission power associated with a reduced transmission power time interval is configured to be lower than transmission power associated with a non-reduced transmission power time interval.

17. The node of claim 16, wherein the plurality of measurement time intervals either:

excludes the second set of time intervals that are allocated as reduced transmission power time intervals; or consists of a subset of the second set of time intervals that are allocated as reduced transmission power time intervals.

18. The node of claim 16, wherein:

the configuration information further indicates, for the second carrier, a second plurality of measurement time intervals; and the instructions, when executed by the one or processors, further cause the node to:

receive the measurement information based on a first plurality of subcarriers, of the second carrier, in the plurality of measurement time intervals; and receive second measurement information based on a second plurality of subcarriers, of the second carrier, in the second plurality of measurement time intervals.

19. The node of claim 16, wherein the measurement information associated with the second carrier comprises channel state information (CSI) associated with the second carrier.

20. The node of claim 16, wherein the instructions, when executed by the one or more processors, further cause the node to transmit, during a reduced transmission power time interval, one of:

a signal consisting essentially of a common reference signal in a control region; or a downlink signal, wherein:

the downlink signal consists of no data;

the downlink signal does not schedule data for transmission;

the downlink signal does not schedule unicast traffic; or the downlink signal schedules data for transmission at a transmission power that is configured to be lower than the transmission power associated with the non-reduced transmission power time interval.

21. The method of claim 1, wherein the one or more control messages comprise one or more radio resource control (RRC) messages.

22. The method of claim 6, wherein the one or more control messages comprise one or more radio resource control (RRC) messages.

23. The wireless device of claim 11, wherein the one or more control messages comprise one or more radio resource control (RRC) messages.

24. The node of claim 16, wherein the one or more control messages comprise one or more radio resource control (RRC) messages.

25. A non-transitory, computer-readable medium having executable instructions stored thereon that, when executed by one or more processors of a wireless device, cause:

receiving, for a first carrier, a broadcast comprising radio resource configuration information that indicates a first set of time intervals that are allocated as reduced transmission power time intervals;

receiving, for a second carrier and via one or more control messages to the wireless device, configuration information that indicates:

a second set of time intervals that are allocated as reduced transmission power time intervals; and a plurality of measurement time intervals; and transmitting measurement information, associated with the second carrier, that is based on the plurality of measurement time intervals;

wherein transmission power associated with a reduced transmission power time interval is configured to be lower than transmission power associated with a non-reduced transmission power time interval.

26. The non-transitory, computer-readable medium of claim 25, wherein the plurality of measurement time intervals either:

excludes the second set of time intervals that are allocated as reduced transmission power time intervals; or consists of a subset of the second set of time intervals that are allocated as reduced transmission power time intervals.

27. The non-transitory, computer-readable medium of claim 25, wherein the configuration information further indicates, for the second carrier, a second plurality of measurement time intervals, and wherein the instructions, when executed, further cause:

transmitting the measurement information based on a first plurality of subcarriers, of the second carrier, in the plurality of measurement time intervals; and transmitting second measurement information based on a second plurality of subcarriers, of the second carrier, in the second plurality of measurement time intervals.

28. The non-transitory, computer-readable medium of claim 25, wherein the configuration information further indicates, for the second carrier, a second plurality of measurement time intervals, and wherein the instructions, when executed, further cause:

measuring, based on the plurality of measurement time intervals, first measurement information for one or more reduced transmission power time intervals; and measuring, based on the second plurality of measurement time intervals, second measurement information for one or more non-reduced transmission power time intervals.

29. The non-transitory, computer-readable medium of claim 25, wherein the instructions, when executed, further cause receiving, during a reduced transmission power time interval, one of:

a signal consisting essentially of a common reference signal in a control region; or a downlink signal, wherein:

the downlink signal consists of no data;

the downlink signal does not schedule data for transmission;

the downlink signal does not schedule unicast traffic; or the downlink signal schedules data for transmission at a transmission power that is configured to be lower than the transmission power associated with the non-reduced transmission power time interval.

30. The non-transitory, computer-readable medium of claim 25, wherein the one or more control messages comprise one or more radio resource control (RRC) messages.

31. A non-transitory, computer-readable medium having executable instructions stored thereon that, when executed by one or more processors of a node, cause:

broadcasting, for a first carrier, radio resource configuration information that indicates a first set of time intervals that are allocated as reduced transmission power time intervals;

transmitting, for a second carrier and via one or more control messages to a wireless device, configuration information that indicates:

a second set of time intervals that are allocated as reduced transmission power time intervals; and a plurality of measurement time intervals; and receiving measurement information, associated with the second carrier, that is based on the plurality of measurement time intervals;

wherein transmission power associated with a reduced transmission power time interval is configured to be lower than transmission power associated with a non-reduced transmission power time interval.

32. The non-transitory, computer-readable medium of claim 31, wherein the plurality of measurement time intervals comprises:

at least one static measurement time interval that is associated with at least one of radio resource management for the second carrier or radio link management for the second carrier; and at least one dynamic measurement time interval that is associated with channel state information (CSI) measurement for the second carrier.

33. The non-transitory, computer-readable medium of claim 31, wherein the configuration information indicates that the second set of time intervals that are allocated as reduced transmission power time intervals is the same as the first set of time intervals that are allocated as reduced transmission power time intervals.

34. The non-transitory, computer-readable medium of claim 31, wherein:

the first set of time intervals that are allocated as reduced transmission power time intervals is a first set of almost blank subframes of the first carrier; and the second set of time intervals that are allocated as reduced transmission power time intervals is a second set of almost blank subframes of the second carrier.

35. The non-transitory, computer-readable medium of claim 31, wherein the transmitting the configuration information comprises transmitting a unicast control message comprising the configuration information.

36. The non-transitory, computer-readable medium of claim 31, wherein the one or more control messages comprise one or more radio resource control (RRC) messages.

37. A system comprising:

a wireless device; and a node;

wherein the node is configured to:

broadcast, for a first carrier, radio resource configuration information that indicates a first set of time intervals that are allocated as reduced transmission power time intervals;

transmit, for a second carrier and via one or more control messages to a wireless device, configuration information that indicates:

a second set of time intervals that are allocated as reduced transmission power time intervals; and a plurality of measurement time intervals; and receive measurement information, associated with the second carrier, that is based on the plurality of measurement time intervals;

wherein the wireless device is configured to:

receiving, for the first carrier, the radio resource configuration information;

receiving, for the second carrier and via the one or more control messages to the wireless device, the configuration information; and transmitting the measurement information associated with the second carrier; and wherein transmission power associated with a reduced transmission power time interval is configured to be lower than transmission power associated with a non-reduced transmission power time interval.

38. The system of claim 37, wherein the plurality of measurement time intervals either:

excludes the second set of time intervals that are allocated as reduced transmission power time intervals; or consists of a subset of the second set of time intervals that are allocated as reduced transmission power time intervals.

39. The system of claim 37, wherein the configuration information further indicates, for the second carrier, a second plurality of measurement time intervals, and wherein the wireless device is further configured to:

transmit the measurement information based on a first plurality of subcarriers, of the second carrier, in the plurality of measurement time intervals; and transmit second measurement information based on a second plurality of subcarriers, of the second carrier, in the second plurality of measurement time intervals.

40. The system of claim 37, wherein the configuration information further indicates, for the second carrier, a second plurality of measurement time intervals, and wherein the wireless device is further configured to:

measure, based on the plurality of measurement time intervals, first measurement information for one or more reduced transmission power time intervals; and measure, based on the second plurality of measurement time intervals, second measurement information for one or more non-reduced transmission power time intervals.

41. The system of claim 37, wherein the wireless device is further configured to receive, during a reduced transmission power time interval, one of:

a signal consisting essentially of a common reference signal in a control region; or a downlink signal, wherein:

the downlink signal consists of no data;

the downlink signal does not schedule data for transmission;

the downlink signal does not schedule unicast traffic; or the downlink signal schedules data for transmission at a transmission power that is configured to be lower than the transmission power associated with the non-reduced transmission power time interval.

42. The system of claim 37, wherein the one or more control messages comprise one or more radio resource control (RRC) messages.

* * * * *